(12) United States Patent
Moudgill et al.

(10) Patent No.: US 9,792,116 B2
(45) Date of Patent: Oct. 17, 2017

(54) COMPUTER PROCESSOR THAT IMPLEMENTS PRE-TRANSLATION OF VIRTUAL ADDRESSES WITH TARGET REGISTERS

(71) Applicant: Optimum Semiconductor Technologies, Inc., Tarrytown, NY (US)

(72) Inventors: Mayan Moudgill, Chappaqua, NY (US); Gary Nacer, Morris Plains, NJ (US); C. John Glossner, Nashua, NH (US); A. Joseph Hoane, Yonkers, NY (US); Paul Hurtley, White Plains, NY (US); Murugappan Senthilvelan, Carmel, NY (US); Pablo Balzola, Madrid (ES)

(73) Assignee: Optimum Semiconductor Technologies, Inc., Tarrytown, NY (US)

( * ) Notice: Subject to any disclaimer, the term of this patent is extended or adjusted under 35 U.S.C. 154(b) by 0 days.

(21) Appl. No.: 15/087,204

(22) Filed: Mar. 31, 2016

(65) Prior Publication Data

US 2016/0314075 A1 Oct. 27, 2016

Related U.S. Application Data

(60) Provisional application No. 62/152,313, filed on Apr. 24, 2015.

(51) Int. Cl.
*G06F 12/10* (2016.01)
*G06F 9/30* (2006.01)
(Continued)

(52) U.S. Cl.
CPC ........ *G06F 9/30029* (2013.01); *G06F 3/0604* (2013.01); *G06F 3/0647* (2013.01);
(Continued)

(58) Field of Classification Search
None
See application file for complete search history.

(56) References Cited

U.S. PATENT DOCUMENTS 4,131,943 A 12/1978 Shiraogawa
4,240,139 A 12/1980 Fukuda et al.
(Continued)

OTHER PUBLICATIONS

International Search Report and Written Opinion dated Aug. 30, 2016 for PCT/US16/25279, 13 pages.

*Primary Examiner* — Duc Doan
(74) *Attorney, Agent, or Firm* — Lowenstein Sandler LLP

(57) ABSTRACT

A computer processor that implements pre-translation of virtual addresses with target registers is disclosed. The computer processor may include a register file comprising one or more registers. The computer processor may include processing logic. The processing logic may receive a value to store in a register of one or more registers. The processing logic may store the value in the register. The processing logic may designate the received value as a virtual instruction address, the virtual instruction address having a corresponding virtual base page number. The processing logic may translate the virtual base page number to a corresponding real base page number and zero or more real page numbers corresponding to zero or more virtual page numbers adjacent to the virtual base page number. The processing logic may further store in the register of the one or more registers the real base page number and the zero or more real page numbers.

46 Claims, 10 Drawing Sheets

(51) Int. Cl.
*G06F 3/06* (2006.01)
*G06F 12/0875* (2016.01)
*G06F 12/0893* (2016.01)
*G06F 12/1009* (2016.01)
*G06F 12/0862* (2016.01)
*G06F 9/32* (2006.01)
*G06F 9/355* (2006.01)

(52) U.S. Cl.
CPC .............. *G06F 3/0673* (2013.01); *G06F 9/30* (2013.01); *G06F 9/3013* (2013.01); *G06F 9/30032* (2013.01); *G06F 9/30043* (2013.01); *G06F 9/30047* (2013.01); *G06F 9/30054* (2013.01); *G06F 9/30058* (2013.01); *G06F 9/322* (2013.01); *G06F 9/355* (2013.01); *G06F 12/0862* (2013.01); *G06F 12/0875* (2013.01); *G06F 12/0893* (2013.01); *G06F 12/1009* (2013.01); *G06F 2212/452* (2013.01); *G06F 2212/60* (2013.01); *G06F 2212/602* (2013.01)

(56) References Cited

U.S. PATENT DOCUMENTS

| | | | |
|---|---|---|---|
| 6,055,650 A * | 4/2000 | Christie | .................. G06F 9/383 710/15 |
| 6,351,806 B1 | 2/2002 | Wyland | |
| 6,732,258 B1 | 5/2004 | McGrath et al. | |
| 2004/0015682 A1 | 1/2004 | Barlow et al. | |
| 2006/0156154 A1 | 7/2006 | Driediger | |

* cited by examiner

COMPUTER PROCESSOR THAT IMPLEMENTS PRE-TRANSLATION OF VIRTUAL ADDRESSES WITH TARGET REGISTERS

CROSS-REFERENCE TO RELATED APPLICATIONS

This application claims the benefit of U.S. provisional patent application 62/152,313, filed Apr. 24, 2015, the disclosure of which is incorporated herein by reference in its entirety.

TECHNICAL FIELD

Embodiments of the present disclosure relate to computer processors, and in particular, to an architecture and implementation of a computer processor that implements pre-translation of virtual addresses with target registers.

BACKGROUND

Generally, modern instruction set architectures build addresses for reading or writing memory by using a general purpose register as the base, and then possibly add or subtract scaled values of other registers and/or immediate values specified in the instruction to obtain a final address. This address is then used to access the memory. Thus, on the x86, the mov ax,[1+bx*4+di] instruction would add the contents of register bx multiplied by 4 to the contents of register di, add 1, and then load the contents of the memory at that address into register ax.

Some older architectures specialized the usage of registers, so that not all registers may participate in all kinds of address computations. However, the trend has been to make instruction sets orthogonal, so that all registers of a particular kind may be used interchangeably in address computation.

Some architectures, the most prominent being the Motorola 68000, had a separate register file (i.e., group of registers) whose primary purpose was to be the base for address computations. In the Motorola 68000, there were two main kinds of registers, data and address. The 8 data registers were used for most computations. The 8 address registers were used as base addresses for address computation. Only a few other operations could be performed on address registers directly (mostly add, subtract and compare); more complicated operations would require the values to be copied to the data registers, and the result copied back.

In modern processors, the address that is generated is a virtual address; the address does not correspond to a real memory location. Instead, the address first goes through a remapping process where the virtual address is translated to a real address. There are many techniques to do this. The techniques that are most commonly used involve the use of pages and translation look-aside buffers (TLBs).

In paging, the real address space is divided into pages; these are typically of some power of 2, such as 4KB, and are aligned on the page size. Assuming 4 KB pages, address 0×000 to 0×fff are page 0, 0×1000 to 0×1fff are page 1, and so on. The virtual address for each process are similarly partitioned. Each virtual page is mapped to a real page. If virtual page 4 is mapped to real page 1, addresses 0×4000 to 0×4fff will map to real memory addresses 0×1000 to 0×1ffff.

There are multiple techniques for maintaining the full mapping between the virtual pages of the processes that are executing and the real pages of the processor. A cache of a subset of these mappings is generally kept in the processor. This cache is called the TLB (or translation look-aside buffer). The TLB is generally implemented as an N-way associative cache (typically N=1,2 or 4), indexed by the page number of the virtual address.

After the load/store address is determined, that virtual address is translated using the TLB. If the page of the address is not in the TLB, special actions need to be taken. This may involve raising an exception in the processor, causing a special piece of software called the TLB miss handler to be invoked, that typically brings the mapping for the virtual page being accessed into the TLB. Alternatively, this TLB miss may be handled entirely or partially in hardware. In either case, after the mapping is added to the TLB, the memory access is re-tried.

In modern processors, under normal operation, a load or store will attempt to look for the data corresponding to that address in a data cache. There can be more than one level of cache in the processor; if so, the first level cache will be probed for the address. If the address is there, (a cache hit), then the value is returned (in case of a load) or written (in case of a store). If not, (a cache miss), then the second level of the cache is examined, and so on until the real memory is potentially reached. Processing a cache miss may cause the address to be added to the earlier cache levels, or it may not—it varies between implementations.

If the cache is probed using the real address, the cache is called a real addressed cache. Alternatively, the processor may choose to use virtual addresses for some of the caches, generally the first level cache. In that case, the cache is called a virtually addressed cache. A virtually addressed cache has the benefit of not requiring the translation to be performed. However, there is a drawback with virtually addressed caches. It is possible for multiple virtual addresses, even within the same process, to refer to the same address. This is known as virtual aliasing. Consider the case where two different virtual address map to the same real address. If the process performs a store using one address, and then reads the same real address using the other virtual address, and both virtual addresses are in the cache, the read will (erroneously) not see the write. There are techniques to correct for virtual aliasing, but they add complexity and are expensive, so it is preferable to use real addresses.

At first glance, it would appear that using a real addressed cache is slower than a virtually addressed cache, since the address needs to be translated before the cache is accessed. However, there are techniques available that allow the translation to proceed in parallel with the lookup. This may hide most of the delay associated with the translation, but at the cost of additional power and area.

Instruction execution on a standard von-Neumann style architecture is built around the idea of a program counter (also known as the instruction pointer and instruction counter). The model for program execution is that the processor loads the instruction stored in the memory at the address in the program counter (abbreviated to PC) and executes it. As part of the instruction execution, the PC is modified. The process is then repeated.

Based on how the PC is modified, instructions may be classified in many ways. This may include:
How the next address is specified
Whether the instruction can specify one or multiple possible next addresses
Intended use, possibly with side effects The most common instructions are fall through instructions—the new PC will point to the next instruction in memory. For architectures with fixed length instructions, such as 32 bit (4 byte) RISC architectures, this may be written as PC<-PC+4. For architectures with variable length instructions, the program counter generally addresses bytes, but the distance to the next instruction is variable. One may write PC<-PC+N, where N is the number of bytes in the current instruction.

Other instructions which may set the PC to values other than the next instruction address are called branch instructions. They may be categorized in different ways. One is how the next address is calculated.

The most straight-forward way for setting the next PC value is to have the new address as part of the instruction. These kinds of branches are called absolute branches. If A is the address specified in the instruction, this would be written as:

PC<-A

Many earlier architectures had absolute addressing. However, as memory sizes grew larger, this form of branching would have required larger instructions. For instance, with 4 byte addresses, the branch instructions would have required 4 bytes to specify the new PC value. In practice, most branch addresses are fairly close to the current address. So, more modern architectures use relative branches; the instruction specifies the offset or displacement from the PC of the instruction to the next instruction to be executed. If D is the displacement specified in the instruction, the new computation is expressed as:

PC<-PC+FD

An alternative source for the address of the next PC value is the contents of some other register. In register indirect branches, the instruction specifies a register in the architecture, and the PC is set to the value of that register. If R is the register, and (R) is the contents of that register, then this may be written as:

PC<-(R)

There are also memory indirect branches; these branches compute an address in memory, and set the PC to the value stored at that address. There are multiple ways of computing the memory address; for instance, the data address could specify a register R and a displacement D, and use those to compute the memory address. In that case, the new PC would be computed as:

PC<-memory[(R)+D]

Obviously, there are other means of specifying the next PC address, such as register relative indirect (where the PC is set to the contents of a register plus a displacement) and chained memory (a form of memory indirect where a bit in the loaded memory indicates that the processor should use the contents of the memory as a address, and load from that address to get the next PC).

Branches may be unconditional, where there is only one possible target.

In conditional branches, generally, a condition is evaluated, and based on that condition, one of several possible addresses is picked for storing into the PC. Generally, on modern architectures, there are only two possibilities, and one of them is the fall-through address (i.e. the next sequential instruction). Assuming a fixed 4-byte instruction width, a conditional relative branch would be written as:
if(cond)

PC<-PC+D else
PC<-PC+4

One variant of conditional branch is called a skip; in this case, the two choices are the next instruction and the next-to-next instruction. So, based on the condition, the next instruction is either executed or skipped, hence the name of this class of conditional branch instructions. For a fixed 4-byte instruction architecture, the skip would be written as:
if(cond)

PC<-PC+8 else

PC<-PC+4

There are more complex conditional instructions, such as the CASE instruction in the VAX-11, that can specify multiple possible next addresses, or the CAS on the IBM 704 which skipped zero, one or two instructions.

Conditional branches may be divided into two categories, based on how the condition is specified in the instruction. In the test-and-branch type of instructions, the branch instruction examines a few bits (generally one or two) of a register and branches based on that result. Generally, the bits will be from a condition code or flag register that stores the status of some previous operation, generally a comparison. Thus, on the x86, to compare two values and branch if they were equal, the instruction sequence that would be employed would be:

```
cmp     ecx, edx ; the two values are stored in ecx and edx registers
je      L1
L0: ; fall-through, not equal case
    ...
L1:; equal case
    ...
```

Alternatively, in the compare-and-branch instructions, the comparison is specified as part of the branch instruction. The equivalent code sequence on the MIPS architecture would be written as:

```
beq $t0,$t1,L1 ; the two values are stored in $t0 and t1
L0: ; fall-through, not equal case
    ...
L1:; equal case
    ...
```

The trade-off between these two forms of branch instructions is the number of bits required to specify a branch. In the first case, the instruction set uses a small number of bits to specify the bit(s) to be examined, and the rest of the bits in the instruction may be used to specify displacements or other sources of the next address. In the second case, the instruction has to specify the details of the comparison operation, which generally requires a larger number of bits.

A major source of branches in programs are subroutine calls and returns. Generally, instruction sets have included specialized support for these kinds of branches. The support maybe quite elaborate. On the VAX-11, the CALLG/CALLS/RET instructions do all actions needed to set up and tear down a frame, including setting up the stack and frame registers, as well as saving and returning to the instruction after the CALLG/CALLS.

Minimally, on a modern architecture, a call instruction will save the address of the instruction after the call and branch to the subroutine. The return address may be saved in memory (on the stack), in a dedicated register (generally called a link register), or in a more general purpose register specified by the call instruction. A return instruction branches to that saved address. If the address is stored in a general purpose register, and the architecture has branch indirect instructions that can branch through those registers, then there may be no specialized return instruction in the architecture, with a return being performed using a regular branch indirect instruction.

A processor fetches a sequence of instructions. When a branch instruction is fetched, the processor must determine the next address to fetch. If the processor waits until the branch is evaluated, and all details about the branch target are known, it could be several cycles later. Consequently, high-performance processors try to guess what the next target of the branch would be. This is known as branch prediction.

For conditional branches, one part of branch prediction determines if the branch is a taken or fall-through. There are many techniques known; the state-of-the-art, 2 bit predictors with history, can achieve very high rates of accuracy.

For taken conditional branches, and for unconditional branches, the processor must also predict or compute the next address. This is more complicated. For a branch-with-displacement, computing the next address involves adding the displacement, typically a 10 to 16 bit number to the current program counter, typically a 32 or 64 bit value. Computing this may add significant delay to the fetch of the next address. There exist techniques that do not require the full add to complete before fetching the instruction; however, they still add to the cycle time.

There exist structures such as next-fetch-address cache that are basically cache structures that are indexed in parallel with the instruction fetch, and return the prediction of the next address to be fetched. Unfortunately, for sizes that are practical to implement, they are not very accurate.

A specialized address branch address predictor is the call stack, used to predict the address of returns. This is based on the simple observation that calls and returns are generally matched. Every time a call is encountered, the address after the call instruction (i.e., the return address for that call) is pushed onto the call stack. When a return is encountered, the address at the top of the call stack is predicted to be the target of the return, and the call stack is popped.

Fetching an instruction also involves cache lookup and translation. The TLB for data and instruction access may be the same; however, it is common for there to be a separate instruction TLB (ITLB) and a data TLB (DTLB).

The other difference between instruction fetch and data fetch is that instructions are generally immutable. Consequently, it does not matter as much if there is virtual aliasing, so it makes it much more practical for the instruction cache to be virtually addressed.

SUMMARY

The above-described problems are addressed and a technical solution is achieved in the art by providing a computer processor with an address register file. The computer processor may include a memory. The computer processor may further include a general purpose register file comprising at least one general purpose register. The computer processor may further include an address register file comprising at least one address register. The computer processor may further include processing logic having access to the memory, the general purpose register file, and the address register file. The processing logic may execute a memory access instruction that accesses one or more memory locations in the memory at one or more corresponding addresses computed by retrieving the value of an address register of the at least one register of the address register file specified in the instruction and adding a displacement value encoded in the instruction.

In the computer processor, the memory access instruction may copy one or more memory values from the computed address into corresponding one or more registers in the computer processor. The one or more registers may be one or more general purpose registers. The one or more registers may be one or more address registers.

In the computer processor, the memory access instruction may copy one or more values from corresponding one or more registers in the computer processor to the memory at a computed address. The one or more registers may be one or more general purpose registers. The one or more registers may be one or more address registers.

The processing logic may add the displacement value to the least one register of the address register file to produce a computed address. The processing logic may use the computed address to perform a copy to/from the memory. The processing logic may update the least one register of the address register file with the computed address.

The processing logic may read an address stored in the least one register of the address register file to produce a first address. The processing logic may use the first address to access the memory. The processing logic may add the displacement to the first address to produce a computed address. The processing logic may update the least one register of the address register file with the computed address. The displacement value may be 0.

The processing logic may process an instruction that may move the contents of an address register of the address register file to or from a general purpose register of the general purpose register file. The processing logic may process an instruction that may add an address value stored in an address register of the address register file and a displacement value to produce a resulting value and may store the resulting value in the address register. The processing logic may process an instruction that adds an address value stored in an address register of the address register file and a value stored in a general purpose register of the general purpose register file to produce a resulting value and may store the resulting value in the address register. The value stored in a general purpose register of the general purpose register file may be shifted prior to adding.

The processing logic may process an instruction that subtracts a first value stored in a first address register of the address register file from a second value stored in a second address register of the address register file to produce a difference value and may store the resulting value in a general purpose register of the general purpose register file. The value stored in the general purpose register may shifted prior to storing.

The computer processor may further include a program counter. The processing logic may further process an instruction that adds a displacement to the program counter to produce a resulting value and may store the resulting value in an address register of the address register file. The processing logic may further process an instruction that may add a signed value to an address register of the address register file to produce a resulting value and may store the resulting value in a general purpose register of the general purpose register file. The processing logic may further process an instruction that may add a first value stored in a general purpose register of the general purpose register file scaled by a second value to an address register of the address register file to produce a resulting value and may store the resulting value in the general purpose register. The processing logic may process an instruction that may compare address values stored in two address registers of the register address file. The results of the comparison may be multiple bits that determine the exact ordering relationship between the value of the first address register and the value of the second address register, and may be stored in a condition flag register. The comparison may test for a specific relationship between the value of the first address register and the value of the second address register and may store a single bit into a register based on whether the test is true or false.

The processing logic may process an instruction that compares two address registers of the address register file to produce a result of the comparison and branches based on the result of the comparison.

The above-described problems are addressed and a technical solution is achieved in the art by providing a computer processor with with indirect only branching. The computer processor may include one or more target registers. The computer processor may further include processing logic in signal communication with the one or more target registers. The processing logic execute a branch instruction based on a value stored in a target register of the one or more target registers. The branch instruction may use the one or more target registers to specify a destination address of a branch specified by branch instruction. The computer processor may further include a program counter in signal communication with the one or more target registers and the processing logic. The processing logic may process an instruction that may add a displacement value to the current value pointed to by the program counter to produce an address and may set the value stored in the target register to the address. Setting the value stored in the target register to the address may comprise copying the value stored in the target register to or from a general purpose register. Setting the value stored in the target register to the address may comprise copying the value stored in the target register to or from a memory.

The processing logic may process an instruction that unconditionally branches to the target register of the one or more target registers. The processing logic may process an instruction that determines the conditions under which the branch is to be taken. In response to the processing logic determining that the branch is to be taken, the processing logic may transfer control to the address stored in the target register of the one or more target registers. The instruction may further specify one or more general purpose registers. The instruction may further specifies an immediate field. The instruction may further specifies one or more floating point registers.

The processing logic may process an instruction that performs a comparison specified as part of the the instruction between two values stored in corresponding registers of one or more registers. In response to the processing logic determining that the branch is to be taken, the processing logic may transfer control to the address stored in the target register of the one or more target registers. The registers specified by the instruction may be one or more general purpose registers. The registers specified by the instruction may be one or more floating point registers.

The processing logic may process an instruction that performs a comparison specified as part of the the instruction between a value stored in corresponding registers of the one or more general purpose registers and a value specified as an immediate field in the instruction. In response to the processing logic determining that the branch is to be taken, the processing logic may transfer control to the address stored in the target register of the one or more target registers.

The processing logic may process an instruction that examines state that results from the execution of a prior instruction to determine if a branch is to be taken. In response to the processing logic determining that the branch is to be taken, the processing logic may transfer control to the address stored in the target register of the one or more target registers. The state may comprise bits that specify the result of a comparion operation between two values by a prior compare instruction. The state may comprise bits that specify the result of an implict comparison between the result of a prior instruction and 0.

The processing logic may process an instruction that executes a call instruction that branches based on a value stored in the target register of the one or more target registers and updates a second target register of the one or more target registers with a return address.

The target register file may be divided into a first group of target registers and a second group of target registers. The first group of target registers may comprise branch target registers, and the second group of target registers may comprise call return target registers.

The processing logic may further to execute a call instruction wherein the call instruction branches based on a value stored in a branch target register of the second group of target registers, and wherein the processing logic is to update a call return target register of the second group with a return address.

The processing logic may further to execute a return instruction wherein the return instruction specifies a call return target register, and wherein the return instruction unconditionally branches to the value in the call return target register. The return instruction may be the only branching instruction that can use a call return register as a branch target register. There may be only one call return target register.

The above-described problems are addressed and a technical solution is achieved in the art by providing a computer processor that implements pre-translation of virtual addresses. The computer processor may include a register file comprising one or more registers. The computer processor may include processing logic. The processing logic may receive a value to store in a register of one or more registers. The processing logic may store the value in the register. The processing logic may designate the received value as a virtual address. The virtual address may have a corresponding virtual base page number. The processing logic may translate the virtual base page number to a corresponding real base page number and zero or more real page numbers corresponding to zero or more virtual page numbers adjacent to the virtual base page number. The processing logic may further store in the register of the one or more registers the real base page number and the zero or more real page numbers.

The processing logic may receive an instruction that specifies at least one register of the one or more registers. The processing logic may read one or more input register values specified in the at least one register and combine the one or more register values to produce a result value. The processing logic may read real translation information stored in the one or more registers and combine the real translation information and the one or more input register values to compute a real translation to a real address of the result value.

The processing logic may further store the result value in a second register. The processing logic may store the result value and the computed real translation to the real address in the second register. The processing logic may designate the result value as a virtual address to access memory. The processor may employ the computed real translation to the real address to access memory.

The result value may be a copy of the one or more input register values and the real translation information may be a copy of translation information associated with the input register. The result value may be the result of adding to or subtracting from an input register a second value, and the real translation information may be obtained from one or more real translations associated with the input register and the second value.

An operation may comprise the addition or subtraction of a register with one or more values specified as one or more immediate values or as on or more register values. When the processing logic computes the addition or the subtraction, and when the computation lies within the range of translated real pages, the processing logic may select a page from the translated real pages and may concatenate page offset bits of the sum with the selected real page.

When an addend/subtrahend is an immediate value with an absolute value less than a page size, the processing logic may further store three real pages in the register corresponding to real address of the page corresponding to the value stored in the one or more input registers. The three real pages may correspond to the real address of the page corresponding to the next higher virtual page, the real address of the page corresponding to the next lower virtual page, and the real address corresponding to the base page. The processing logic may, after the sum is computed, select one of the three real pages based on whether a translation results in an underflow, an overflow, or points to the base page, and a page offset may be concatenated with the selected page.

When an addend/subtrahend is an immediate value with an absolute value less than one half the page size, the processing logic may further store two real pages in the register corresponding to real address of the page corresponding to the value stored in the one or more input registers. The two real pages may correspond to the real address of the page corresponding to one of the next higher virtual page or the next lower virtual page, and the real address may correspond to the base page, determined based on whether the value in the register is in the higher half of its current page or the lower half of its current page. The the processing logic may, after the sum is computed, select one of the two real pages based on whether a translation results in an underflow, an overflow, or points to the base page, and a page offset may be concatenated with the selected page.

The one or more registers may be one or more general purpose registers.

The computer processor may not store real translation information for all registers.

The real translation information may be computed for a pre-determined subset of all registers.

The computer processor may dynamically determine which instructions or registers or both instructions and registers have their results generate real translations. The computer processor may employ history based prediction to dynamically determine which instructions or registers or both instructions and registers are employed for translating a virtual base page number to a corresponding real base page number and zero or more real page numbers corresponding to zero or more virtual page numbers adjacent to the virtual base page number.

The one or more registers may be one or more address registers.

A write to a register of the one or more registers with a valid real translation may initiate a prefetch of data into a level of a memory hierarchy.

The processing logic may further to store in the one or more registers only the real base page number corresponding to a virtual address. A write to the register of the one or more registers may trigger a prefetch of data into a register associated with a register file.

When the processing logic cannot map the virtual address to one or more real address in the register file, the processing logic may wait until a load or store instruction is executed that employs the virtual address to raise an exception.

The above-described problems are addressed and a technical solution is achieved in the art by providing a computer processor that implements pre-translation of virtual addresses with target registers. The computer processor may include a register file comprising one or more registers. The computer processor may include processing logic. The processing logic may receive a value to store in a register of one or more registers. The processing logic may store the value in the register. The processing logic may designate the received value as a virtual instruction address. The virtual instruction address may have a corresponding virtual base page number. The processing logic may translate the virtual base page number to a corresponding real base page number and zero or more real page numbers corresponding to zero or more virtual page numbers adjacent to the virtual base page number. The processing logic may further store in the register of the one or more registers the real base page number and the zero or more real page numbers.

The processing logic may receive an instruction that specifies at least one register of the one or more registers. The processing logic may read one or more input register values specified in the at least one register and combine the one or more register values to produce a result value. The processing logic may read real translation information stored in the one or more registers and combine the real translation information and the one or more input register values to compute a real translation to a real address of the result value. The processing logic may store the result value in a second register. The processing logic may store the result value and the computed real translation to the real address in the second register. The processing logic may designate the result value as a virtual address to access memory. The computer processor may employ the computed real translation to the real address to read instructions from memory. The result value may be a copy of the one or more input register values and the real translation information may be a copy of translation information associated with the input register.

The result value may be the result of adding to or subtracting from an input register a second value. The real translation information may be obtained from one or more real translations associated with the input register and the second value.

An operation may comprise an addition or a subtraction of a register with one or more values specified as one or more immediate values or as on or more register value. When the processing logic computes the addition or the subtraction, and when the computation lies within the range of translated real pages, the processing logic may select a page from the translated real pages and the processing logic may further concatenate page offset bits of the sum with the selected real page.

When an addend/subtrahend is an immediate value with an absolute value less than a page size, the processing logic may store three real pages in the register corresponding to real address of the page corresponding to the value stored in the one or more input registers. The three real pages may correspond to the real address of the page corresponding to the next higher virtual page, the real address of the page corresponding to the next lower virtual page, and the real address corresponding to the base page. The processing logic may, after the sum is computed, select one of the three real pages based on whether a translation results in an underflow, an overflow, or points to the base page, and a page offset may be concatenated with the selected page.

When an addend/subtrahend is an immediate value with an absolute value less than one half the page size, the processing logic may store two real pages in the register corresponding to real address of the page corresponding to the value stored in the one or more input registers. The two real pages may correspond to the real address of the page corresponding to one of the next higher virtual page or the next lower virtual page, and the real address corresponding to the base page, determined based on whether the value in the register is in the higher half of its current page or the lower half of its current page. The processing logic may, after the sum is computed, select one of the two real pages based on whether a translation results in an underflow, an overflow, or points to the base page, and a page offset may be concatenated with the selected page.

The one or more registers may be one or more general purpose registers.

The computer processor may not store real translation information for all registers. The real translation information may be computed for a pre-determined subset of all registers. The computer processor may dynamically determines which instructions or registers or both instructions and registers have their results generate real translations. The computer processor may employ history based prediction to dynamically determine which instructions or registers or both instructions and registers are employed for translating a virtual base page number to a corresponding real base page number and zero or more real page numbers corresponding to zero or more virtual page numbers adjacent to the virtual base page number.

The one or more registers may be one or more branch target registers.

A write to a register of the one or more registers with a valid real translation may initiate a prefetch of instructions into a level of a memory hierarchy.

The processing logic may store in the one or more registers only the real base page number corresponding to a virtual address.

A write to the register of the one or more registers may trigger a prefetch of instructions into a register associated with a register file. When the processing logic cannot map the virtual address to one or more real address in the register file, the processing logic may wait until a branch instruction is executed that employs the virtual address to raise an exception.

The above-described problems are addressed and a technical solution is achieved in the art by providing a computer processor with register direct branches and employing an instruction preload structure. The computer processor may include a hierarchy of memories. The hierarchy of memories may comprise, but is not limited to, an instruction cache, a data cache, and a level two cache. The hierarchy of memories may comprise a first memory organized in a structure having one or more entries for one or more addresses corresponding to one or more instructions. The one or more entries of the one or more addresses may have a starting address. The structure may have one or more locations for storing the one or more instructions. The computer processor may further comprise one or more registers to which one or more corresponding instruction addresses are writable. The computer processor may further comprise processing logic. The processing logic may include integer compute logic for performing compares and/or determines if a branch is to be taken. The processing logic may include branch compute logic for comparing floating point registers and comparing address registers. The processing logic may include branch predictor logic to keep one or more branch prediction entries up-to-date. The processing logic may include instruction prefetch logic for identifying a next group of instructions to be read by selecting one of as yet un-prefetched addresses.

In response to the processing logic writing the one or more instruction addresses to the one or more registers, the processing logic may pre-fetch the one or more instructions of a linear sequence of instructions from a first memory level of the hierarchy of memories into a second memory level of the hierarchy of memories beginning at the starting address. At least one address of the one or more addresses may be the contents of a register of the one or more registers.

At least one address of the one or more addresses may be the next address for a sequence of instruction currently being processed. At least one address of the one or more addresses may be the next address of the last of the linear sequence of prefetched instructions.

The one or more entries may further comprise one or more branch prediction entries provided by the branch predictor logic for the one or more instructions. The one or more instructions in the linear sequence may correspond to a cache-line. The one or more entries may further comprise an address of the next instruction following the stored one or more instructions in the first memory level of the hierarchy of memories.

The targets of branch instructions may be one or more addresses stored in one or more corresponding registers. The one or more addresses stored in one or more corresponding registers may include a fall-through address of the instruction sequence being processed. The one or more addresses stored in the one or more corresponding registers may include a fall-through addresses for a branch instruction target. The one or more addresses may comprise one or more addresses from a call stack. The call stack is implemented as a stack of pointers to the one or more entries.

BRIEF DESCRIPTION OF THE DRAWINGS

The present invention may be more readily understood from the detailed description of an exemplary embodiment presented below considered in conjunction with the following drawings.

DETAILED DESCRIPTION

Address Registers

An architecture of a computer processor is proposed that contains address registers, and all data accesses are based on the contents of the address register, possibly plus a displacement encoded in the data access (i.e., load/store/cache control) instruction. Translation Caching This architecture treats any value written to the address register as a virtual data address, and translates the virtual data address to a real address, keeping both the virtual address value and the real address value in the register. When a data access instruction such as a load or store is sent for execution, the processor reads the real address corresponding to the address register being used by the load/store instruction and consequently may use the real address to access the memory without the delay for translation.

For example, assume there are 8 address registers $a0 . . . $a7. Assume an instruction writes 0x40c8 to register $a3. During the writing process, the implementation may translate the address, say to 0x10c8. Both the values 0x40c8 and 0x10c8 are stored in the register. Now assume there is a load that uses $a3 as the base, say ldw $r11,$a3 (i.e., load a word from the memory address in $a3 into register $r11). In that case, the real address 0x10c8 is used to access the data-cache, without needing to do any translation.

Figure 1:
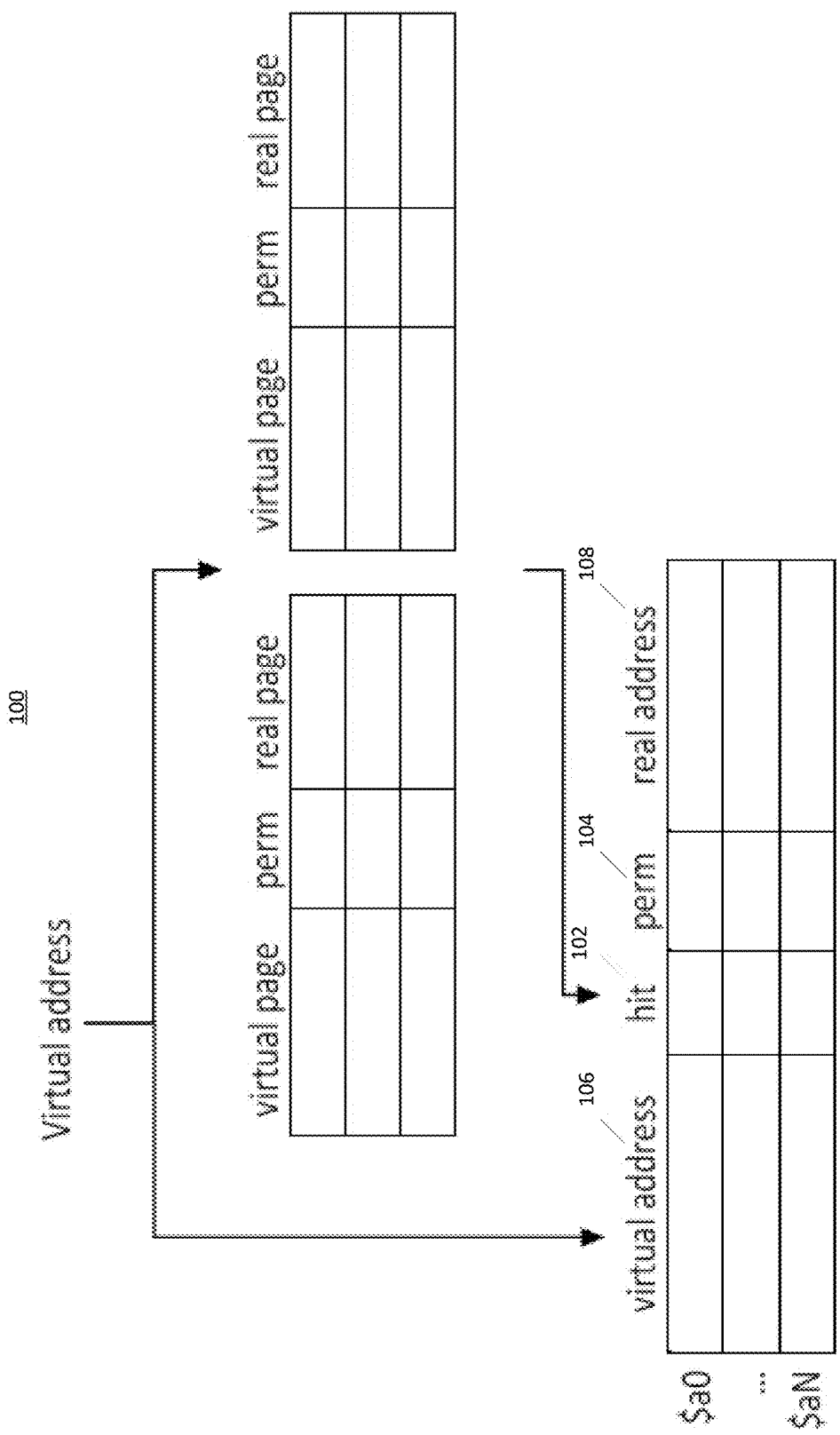
FIG. 1 illustrates one example of realization of translation caching for an architecture with base-only addressing using a 2-way set associative translation look-asside bus (TLB).

FIG. 1 illustrates one example of realization of translation caching for an architecture with base-only addressing using a 2-way set associative translation look-aside bus (TLB) 100. The hit field 102 is a single bit field denoting whether the page was successfully translated or not. The perm field 104 corresponds to the read/write and other permissions associated with the page.

Note that the lower bits of the virtual address 106 and the real address 108 are the same; the exact number may depend on the page size. An implementation may choose to share them. However, because of the different usage of the two addresses—virtual addresses may be used for address arithmetic, while the real address may be used for load store—the two addresses are kept separate. This will permit an implementation to physically place the virtual address 106 and the translation cache bits (hit, perm, real address) in different places.

In the TLB 100 shown above, only the virtual page address is being used as the tag for the TLB 100. This is only to simplify the example; in actual practice, there will be other data that will be part of the tag, such as a process id.

Base+Displacement

The case where a memory access uses an address register only is called base addressing. It is sometimes desirable to support base+displacement memory accesses as well. In this case, an immediate value stored in the instruction is added to the address register to generate the address that is used for the memory access.

If it is desired to support base+displacement addressing in the instructions, to take advantage of early virtual to real mapping, when an address is written, the mappings of all pages that may be accessed based on the size of the displacement are stored with the address register. When a memory access address is computed using base+displacement form, then the appropriate page translation is selected. This is not as direct or efficient as the case of base-only addressing described above, but is still more efficient than the alternative of doing a full translation.

As an example, assume that all pages are 4KB, and that the maximum displacement is a 12-bit signed number, so that a value in the range +2047 to −2048 can be added to the base address. In this case, only need 3 pages need to be translated simultaneously when an address is written; the page of the address, the preceding page, and the next page. Assume page 0x4 is mapped to 0x1 as above, and 0x3 is mapped to 0x23, and 0x5 to 0x8. In that case, continuing the example from above, when 0x40c8 is written to $a3, the translation of pages 0x3,0x4 and 0x5 to 0x23,0x1,0x8 are also saved with the address register. Now, assume that the processor execute the base+displacement instruction ldw $r11,$a3,−0x800. This will underflow the base page, and so the preceding page mapping (i.e. for 0x3) may be employed from the saved translation, obtaining 0x238c8 as the real address. Similarly, if the processor computes the address for instruction ldw $r11,$a3,0xff0, the processor computes virtual address 0x50b8, and by using the translation for page 0x5 saved in $a3, the real address 0x80b8 can be computed efficiently.

It is preferred that the maximum displacement and minimum page size be picked so that the displacement is smaller than the page. Otherwise, to take advantage of the technique described above, more pages may be needed. Assume, in the example above, that pages were only 2KB. In that case, 5 pages need to be translated simultaneously×the base page, the 2 preceding ones and the 2 next ones, and save them.

If the displacement is smaller than the page size, then depending on the value of the base, the base+displacement will either never overflow or never underflow. Assume that, in the example above the maximum possible displacement is 11 bits, not 12. In that case the maximum value that can be added to 0x40c8 is +511 (or 0x3ff), giving the address 0x44c7, which is still in page 4. Thus, the maximum base+displacement value using that register will never overflow. However, the minimum value that can be added is −512 (or −0x400), giving 0x38c8, which is not in the same page. So, during the translation process, the processor can detect based on the address whether overflow or underflow is possible, and save only two mappings in the address register. For sufficiently large differences between page size and displacement, it may be possible to have addresses written to the address register that can neither overflow nor underflow. However, it is still necessary to have provision for an overflow/underflow page mapping to be stored with the address register, since it is always possible to write a value that could under/overflow; consider writing the value of the first/last address in a page; any negative/positive displacement will cause an under/overflow respectively.

DTLB Organization for Base+Displacement

There is no modification to the DTLB required to support the base-only case. In the case of base+displacement, the DTLB has to be modified to return the translation for 3 (displacement =page size), 2 (displacementpage size) pages simultaneously. One way to do this is to add extra read ports to the TLB 100, and look up the multiple pages simultaneously.

Alternatively, each TLB entry may store multiple translations. In this approach, each TLB entry will store the real addresses for the previous page(s), the base page, and the next page(s). This increases the number of bits with each entry, since TLB entries will now need to save multiple pages, but reduces the number of read ports.

The case where the displacement is less than the page size, each entry in the multi-translation TLB will still need 3 pages. Based on the whether the address can underflow or overflow with minimum/maximum displacement either the previous and base page or base and next page are selected. This may be done by checking a single bit, to determine if the address being written is in the lower or upper half of the page. If the page size is 4 KB, this would mean looking at bit 11 of the address.

Figure 2:
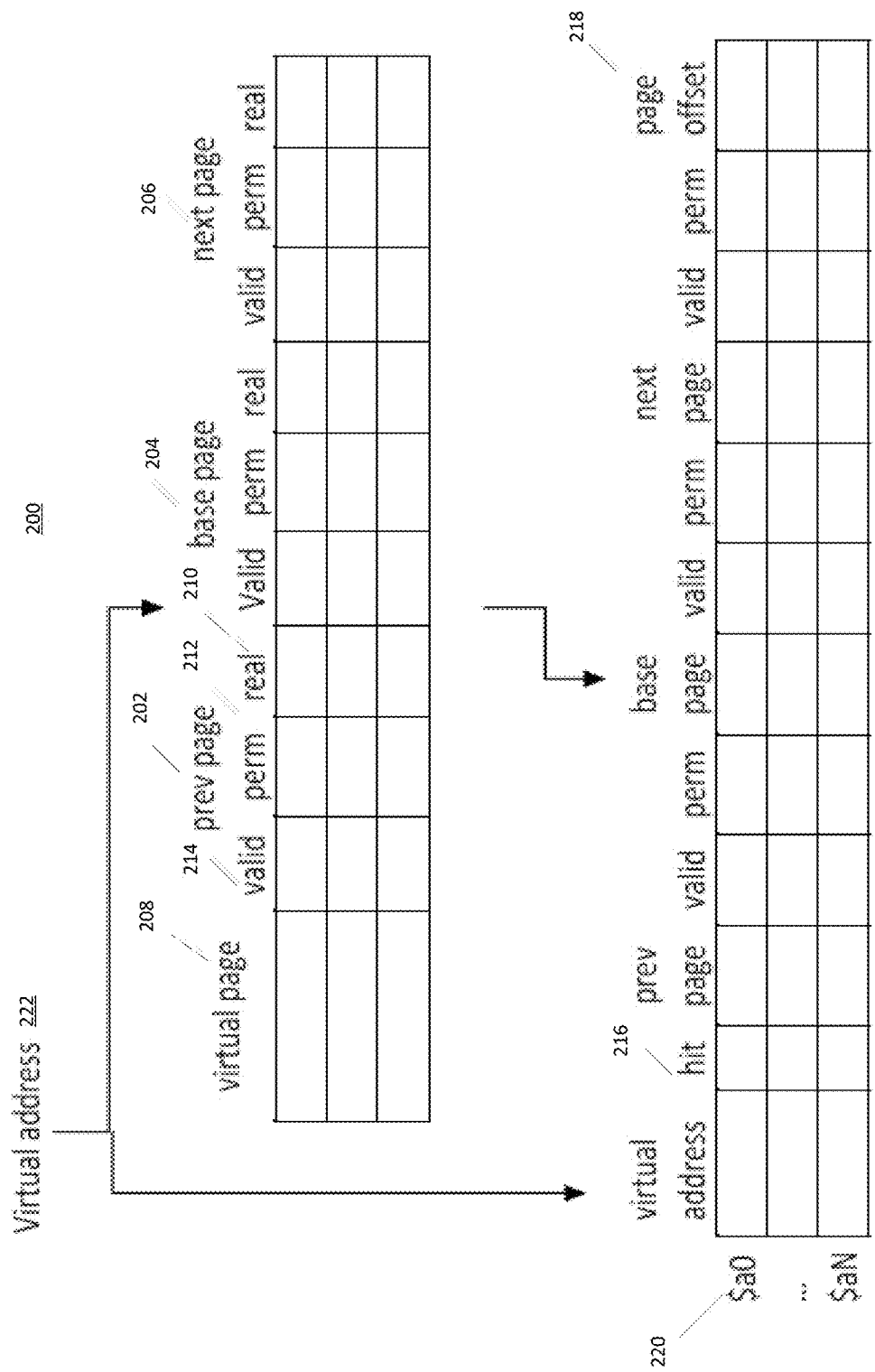
FIG. 2 illustrates one example of an organization of address translation caching for an architecture where the displacement and page size are identical, assuming a direct mapped TLB that contains mappings for the previous, base and next pages for each virtual page.

FIG. 2 illustrates one example of an organization of address translation caching for an architecture where the displacement and page size are identical, assuming a direct mapped TLB 200 that contains mappings for the previous virtual page 202, base virtual page 204 and next virtual page 206 for each virtual page 208. Each of the lines in the entry contains the virtual page 208, the real pages 210 corresponding to the previous virtual page 202, base virtual page 204 and next virtual page 206 and the permissions 212 for those pages. It also contains a valid bit 214 indicating whether there is a virtual to real mapping for that page. If there is not, when the page is used, the processor will take an exception.

The address register 220 contains a hit bit 216 indicating that the TLB entry data is valid, copies of the 3 real pages, and the offset 218 within the page for the address. Again, this offset 218 may be read from the virtual address register page offset 218, if the implementation chooses to share the offsets for the virtual address 222 and for the real addresses.

TLB Miss/permission Handling

When an address register 220 is written, there may not be sufficient information to map the virtual address 222 being written to a real address; i.e., a TLB miss has occurred. The processor may choose to raise a TLB miss exception, or to start the hardware state machine to start fetching the TLB data at this point. A preferred implementation, however, is to wait till a load or store instruction is executed that uses that address register 220, and raise the TLB exception/reload the TLB 200 at that point. In this implementation, after the TLB miss is processed, the address register 220 may be reloaded with the same virtual address 222, however this time, because a mapping exists, the correct real page(s) will be stored with the address register 220.

A TLB 220 also contains read/write and other permissions 212 for a page. As part of the translation caching process, the permission bits 212 for the translated page(s) may be stored with the address register 220. When a load or store instruction is executed, the permission bits 212 stored in the address register are examined, and a permission exception is raised if necessary. There may be other page properties that are stored in the TLB 220 that are will need to be copied, such as cache control directives (e.g., write-back vs. write-through, cacheable/non-cacheable, etc.).

If a virtual to real address translation is voided or updated for some reason, then the translations stored with the address registers 220 may need to be altered to reflect the new state of affairs. The simplest way to do this is to rewrite the address registers 220 with their current contents, causing the processor to re-perform the translation, and thereby update the translations stored with the address registers 220.

Other Instructions

In programming languages such as C, memory addresses are generally represented using pointers. The most frequent uses of pointers, other than as load/store addresses are:
Produce another pointer by adding/subtracting a constant or a computed value
Compare the pointer against 0 or against another pointer
Take the difference of two pointers Generally, when an offset is added to a pointer, or when two pointers are subtracted, it is necessary to scale the two pointers by the size of the object pointed to by the pointer. The most common sizes are 1,2,4, and 8B.

In one preferred implementation, the following instructions are proposed:
addai $at,$aa,#imm: add the signed constant #imm to address register $aa and store the result in target address register $at $at<-$aa+#imm addar $at,$aa,$rb,#scl: add general purpose register $rb scaled by the immediate value #scl to address register $aa, and store the result in target address register $at $at<-$aa+($rb<<#scl)

asub $rt,$aa,$ab,#scl: subtract the address register $ab from $aa, scale difference by immediate value #scl, and store the result in general purpose register $rt $rt<-($aa-$ab)>>#scl The instructions intended for handling pointer compares will depend on whether the instruction set uses test-and-branch or compare and branch. In the first case, the additional address register instruction would compare two address registers and set a condition code or flag. In the second case, the additional instruction(s) would compare two address registers and branch based on the nature of the comparison.

Note that all these instructions can be executed using a simple ALU to perform the add/subtract/compare.

It is useful to compute data addresses relative to the current PC. This allows for relocatable data, such as program constants, to be accessed quickly. In a preferred implementation, the following instruction is proposed:
addpci $at,#imm: add the signed constant #imm to the program counter, and store the result in target address register $tt.

Additionally, the architecture needs to have means to move addresses to/from general purpose registers to handle the cases where it is required to handle an address computation that requires complicated processing of an address. Also, the architecture needs to have means to save and restore the contents of the address register to/from memory. These can be accomplished by having instructions that:
Load/store from address registers to memory
Copy address registers to/from general purpose registers If only one of the two classes of instructions is available, then the behavior of the other class of instructions may be synthesized using a sequence of instructions. For instance, to move address registers to memory, each address register could be first copied to a general purpose register, and then the general purpose register may be stored.

Optimizing Translation

It is possible, using the instructions suggested above, to optimize the translation of virtual to real page(s). If the result of the sum of an address register with a value from a register/immediate add does not cross page boundaries, i.e., if the source address and result address are in the same page, the processor may reuse the translation cached with source register for the result register. In this case, the TLB lookup may be bypassed, saving energy and possibly enhancing performance.

Register File Ports

In the case where the instructions that may operate on addresses are the set described above, the address register file will have at most 2 read ports and one write port to support arithmetic on address registers, which will read the values (i.e., virtual addresses) stored in the address registers. The real addresses/pages that are stored with the address register will require a separate port to provide the addresses for memory access operations. If an attempt is made to implement the optimization where the cached address mapping may be reused, a port is needed to supply the real mapping for the source address register. Thus, it is possible to execute both a load/store instruction and an address arithmetic operation in parallel using only 2 read ported register files.

Prefetch in Base-Only

The base-only variant of the address register architecture is one where all memory accesses are performed via an address stored in the address register, with no displacement. In this architecture, when a value is written to an address register, there is a high probability that the intention is to use that value as a read or write location. An implementation can exploit this by using a write to an address register as a prefetch hint—i.e., to initiate bringing in a line to the top-most level cache.

Note that there is no guarantee that a value written to the address register will be used; the program may load the address register in anticipation that it will use that value as an address and then choose to not do so. Alternatively, in an out-of-order implementation of the architecture, the register write may be performed speculatively, and it may turn out that some branch prediction in the sequence was incorrect.

Consequently, an implementation may choose to employ heuristics about how aggressively to perform the prefetch. As an example, consider an out-of-order implementation with two levels of on-chip cache and external memory. The heuristic used may be that, if the address write is speculative, to fetch the line from the second level of cache to the first level but not from memory, while if the address write is non-speculative, to fetch the contents of that address from external memory if necessary.

Preload in Base-Only

The idea of a prefetch can be extended to actually load the data associated with the address in the address register into a structure that is a hash table tagged by addresses or a table that is indexed by address register number, or both. The size of the data that is loaded can be:

The maximum sized value that can be read/written. Thus, if the architecture supports 64 bit loads, then 8B of data will be loaded.

A cache line—specifically, the cache line that contains the address in the address register Two cache lines—the cache line containing the address and the next cache line. This particularly applies if the architecture supports unaligned memory accesses, so that load/stores can be split across cache lines.

Other intermediate sizes

If the structure is a hash-table tagged by addresses, then the structure resembles a fully-associative cache positioned at the top of the memory hierarchy. This is particularly true if the width of data picked is a multiple of the cache line size.

When data is preloaded, the address register that triggered the preload is known. The data that is preloaded can be associated with that address register. In the one implementation 300, shown in FIG. 3, space can be allocated for the data in the address register 302 itself. This may be called inline preloading. A load using a particular address register as the base will extract the necessary bytes from the preloaded data. A store using an address register 302 as its base will overwrite the relevant bytes in the preloaded data, as well as write to the memory hierarchy.

Inline preloading suffers from the problem that multiple address registers may refer to the same or to overlapping addresses. So, for correctness, a store has to overwrite not only the data stored inline with its address register 302, but with also any other address registers that contain data from the addresses.

Figure 4:
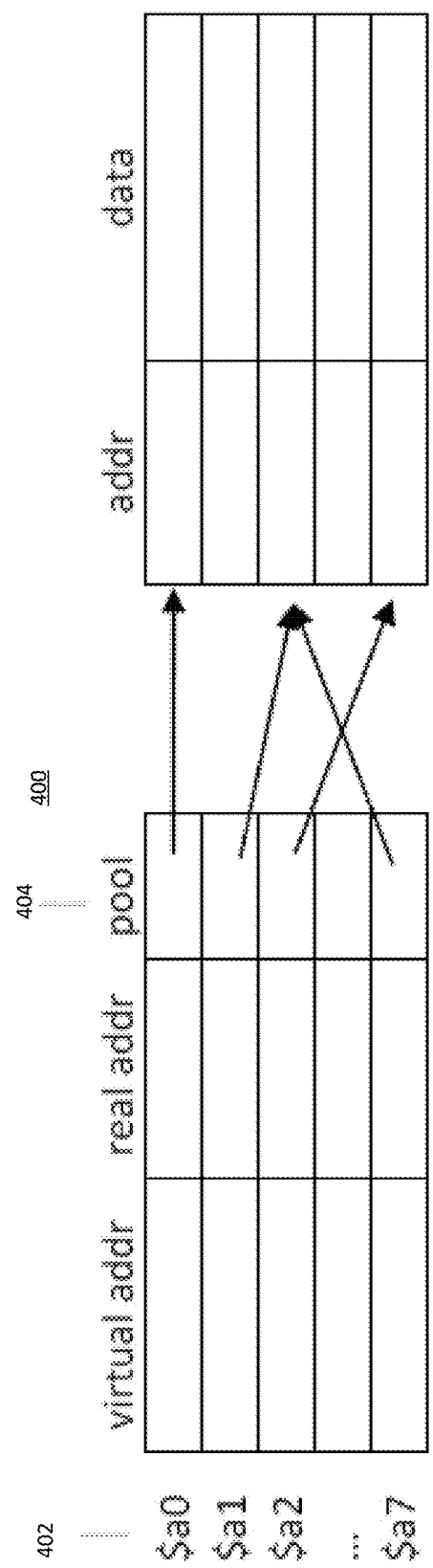
FIG. 4 is a diagram illustrating an address register file with buffered preload data.

An alternative implementation 400 is to have a pool of buffers 404, where the number of buffers is at least the number of address registers 402. Each address register 402 will point to a buffer 404. If two address registers 402 hold are identical or overlapping values, they will use the same buffer 404, as shown in FIG. 4. This avoids the issue with stores to addresses that are present in multiple address registers.

This implementation assumes that all loads and stores are aligned. If they may be unaligned, then one possible implementation is to have twice as many buffers in the pool of buffers 404 and have the two buffers 404 associated with each address. An unaligned load to an address register 402 will read from both buffers 404, while an unaligned store will potentially overwrite bytes in both buffers 404.

A buffer in the pool of buffers 404 will be freed when all the registers pointing to the buffer have been overwritten with new values that make them point to other buffers. Alternatively, in the case of an implementation with register-renaming, a register that has been freed will be treated as not pointing to a buffer 404.

Figure 3:
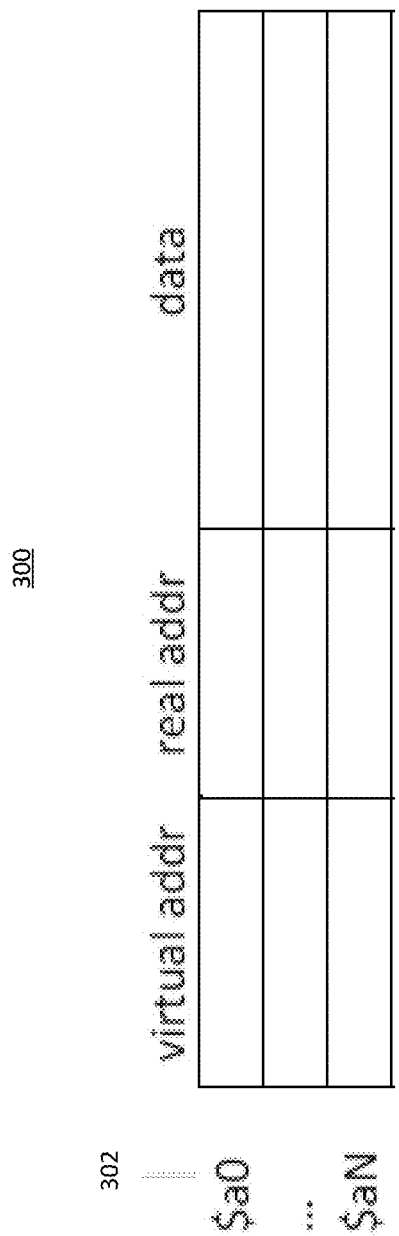
FIG. 3 is a diagram illustrating an address register file with inline preload data.

In both FIG. 3 and FIG. 4, both a virtual address and a real address are shown, indicating that there is translation caching as well as preloading. It is possible to implement preloading without have translation caching.

Since preloading is a form of caching, when a data-cache line is modified, such as by a cache control instruction, or by coherence traffic, then the preloaded cache lines must also be altered to reflect the changed memory hierarchy.

Miss Handling

So far, in the treatment of preloading, it has been assumed that every time a value is written to an address register, the contents at that address are fetched from the memory hierarchy. For the same reasons as described in the section on prefetch, it may be chosen to not always complete the preload.

To implement that behavior, a state-machine with 4 states is proposed:

Unsent: an address has been written to the address register (or buffer), but no request has been sent out to the memory subsystem;

Sent: a request for loading the data associated with the address register (or buffer) has been sent, but has not returned;

Miss: the request was returned unsatisfied, because it was not present in the part of the cache hierarchy we heuristically looked at; and Avail: the data is available.

When an address is written to the address register, or when a buffer is first allocated on a write to an address register, the state-machine would be set to Unsent. At some point, the request is sent to the memory hierarchy, and the state-machine is set to Sent. A subset of the memory hierarchy is investigated based on various heuristics, such as degree of speculation. If the data for that address is found, the data is saved in the address register/buffer, and the state-machine is set to Avail. If the data for that address is not found, then a the state-machine is set to Miss. Later, when it becomes apparent that the data is needed, such as when a non-speculative load/store is done using that register/buffer as that base, the request for data is reissued. This time the request is issued so that the load must complete, even if it requires fetching from main memory.

Load/Store with Displacement

A base-only load/store instruction has to only encode a destination/source register, an address register, and an opcode. This will leave a large number of bits in the instruction unused. Accordingly, adding load/store with update instructions that use these extra instruction bits to provide an immediate value that may be employed as a displacement that is used to post-increment the memory operation. Thus ldw $rt,$aa,#imm will load $rt from the memory location in $aa, then set $aa to the value of $aa+#imm.

Target Registers

An architecture of a computer processor may be proposed where all branches are indirect, via a dedicated set of registers that may be called the target registers.

An architecture where all branches are via a dedicated set of registers is very similar to the case of address registers where all loads and stores are base direct. Consequently, the various performance optimizations described above, namely translation caching, prefetch and preload, are all applicable to such an architecture. However, there are some differences. The obvious differences are that implementation optimizations for target registers must use instruction resources, rather than data resources. This includes using the instruction TLB and prefetching into the instruction cache.

Instructions do not suffer from the aliasing problem; even if two virtual addresses point to the same real address, it is rare that the instruction at that address will be changed. When a line containing an instruction is changed, such as by a JIT engine, software may take corrective action to ensure that all virtual addresses that could point to the instruction are invalidated and refreshed, or otherwise synchronized. These actions can be expensive, but given the rarity of instruction rewriting, the amortized cost is negligible. Consequently, it is possible to have virtually addressed top level instruction caches, which decreases the benefit of translation caching.

This same rarity of instruction update makes it feasible to use inline preload for instructions.

Fall-Through

After a branch is executed, instructions are fetched and executed till the next taken branch is encountered. This may be an arbitrarily long sequence, possibly spanning multiple cache lines, or as short as one instruction, if the branch target is itself a taken branch.

With preloading, for each target register, a certain number of instructions are preloaded. If that target register is branched to, and no taken branch is encountered while executing the preloaded data, the next sequential address is called the preload fall-through address. Assume that an architecture has 4B instructions and an implementation has 32B line size, and that the implementation preloads one cache line at a time. Assume that the value 0×1014 is written to target register $t1. The processor then preloads the line containing 0×1014, which will be the bytes 0×1000 to 0×102f. If program branches to $t1, the implementation will use the preloaded data starting at 0×1014. If there is no taken branch, the instructions at 0×1014, 0×1018 and 0×101c will be executed, and the processor will then attempt to execute the instruction at the preload fall-through address 0×1020.

Every target register has a fall-through address. The active fall-through is the fall-through value for the preloaded values being executed. Thus, in the example above, 0×1020 becomes the active fall-through as soon as the branch to $t1 is executed.

A possible implementation of preloading treats the active fall-through address as though it were also a target register, and will attempt to preload the instructions that at that address.

Figure 5:
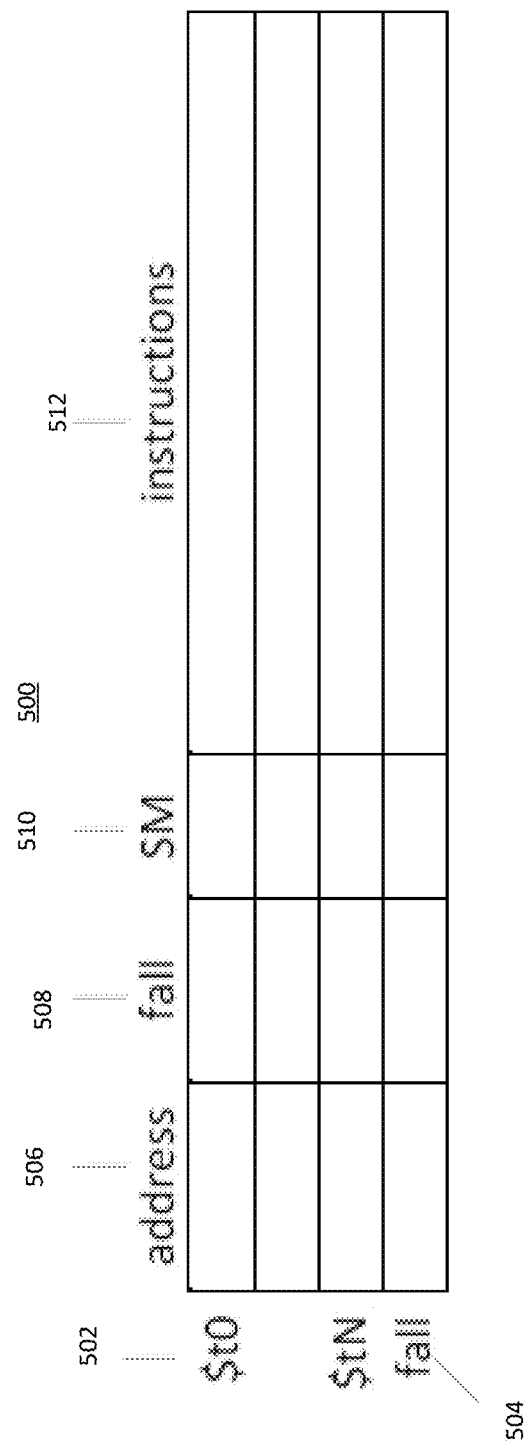
FIG. 5 is a diagram illustrating a target register preload structure.

FIG. 5 shows a target register file and preload structure 500. There is one entry for each target register 502, and one for the active fall-through 504. The following values are stored with each entry The address 506; in the case of the fall-through register, this is the active fall-through address The fall-through address 508: this is the fall-through address that would be used if this line was used SM 510: the miss-handling state-machine Data 512: preloaded data The preloaded data 512 can be an instruction cache line, aligned so that the first instruction in the preload data is the instruction pointed to by the address 506.

Setting the Target Register

The most common way to set the target register will be to add a displacement to the current PC, and write that value to a target register. This instruction may be called i taddpci $tt,#disp ; it sets target register $tt to PC+displacement.

The target registers need to be saved and stored. This may be accomplished by copying to/from the general purpose registers, or saving directly to memory, or both.

Using the Target Register

All unconditional branches will simply branch to a target register.

Depending on whether the architecture has a test-and-branch or compare-and-branch instruction philosophy for dealing with conditional branches, the conditional branch instructions will look like beq $t0 or bgt $r0,$r1,$t0, where the first form tests the condition code register to see if the previous compare set the equal flag, and the second form compares the two registers for greater than. If after checking the condition/comparing the values, it is determined the branch should be taken, control is transferred to the address in target register $t0.

Since all branch destinations are specified in a few bits as target registers, as opposed to using a large number of bits to specify displacement, there will be a large number of bits left in the instruction to specify general purpose registers, and possibly an immediate field. This makes preferred choice compare-and-branch style instructions.

Using compare-and-branch may not even cause additional cycle delay when branch prediction is being used; only the results of the compare may be used to confirm whether the branch prediction was correct. If it was, there is no additional work. If the branch prediction is incorrect, then corrective action needs to be taken, including restarting the pipeline.

Call/Return

It is proposed to have an architecture that has explicit call and return instructions. The call instruction will branch via a target register, and update another target register with the return address (i.e. the address of the instruction after the call instructions). In principle, the return address could be written to any target register; in practice, however, the because of the way calling-conventions and application binary interfaces (ABIs) are defined, one register will always be used.

A return via a target register is indistinguishable from an unconditional jump via that register. This raises the risk that returns and unconditional jumps will be used interchangeably. So, it is further proposed to have a target register that can be written by call instructions but not by taddpci instructions, and can be branched to via return instructions, but not by other conditional or unconditional branch instructions. This may be called the link target register.

Call Return Stack

Having explicit call/return instructions makes it straightforward to implement branch prediction using a call return stack; every time a call is executed, the return address is pushed on the call return stack, and every time the return is executed, the stack is popped, and the popped address is used as the predicted address for the return. If the call stack overflows, the bottom-most entries are overwritten. If the call-stack underflows, then no prediction can be performed, and the usual branch handling logic kicks in.

If preload is employed, then when a call is executed, the link register is written. This triggers a preload into the entry for the link register. If there is a subsequent call, the link register will be overwritten, triggering yet another preload, resulting in the previously preloaded value being overwritten. The processor could choose to save preloaded values in the call return stack, as well; so, every time the link register was preloaded, the same data was also written to the entry at top of the call-return stack.

Figure 6:
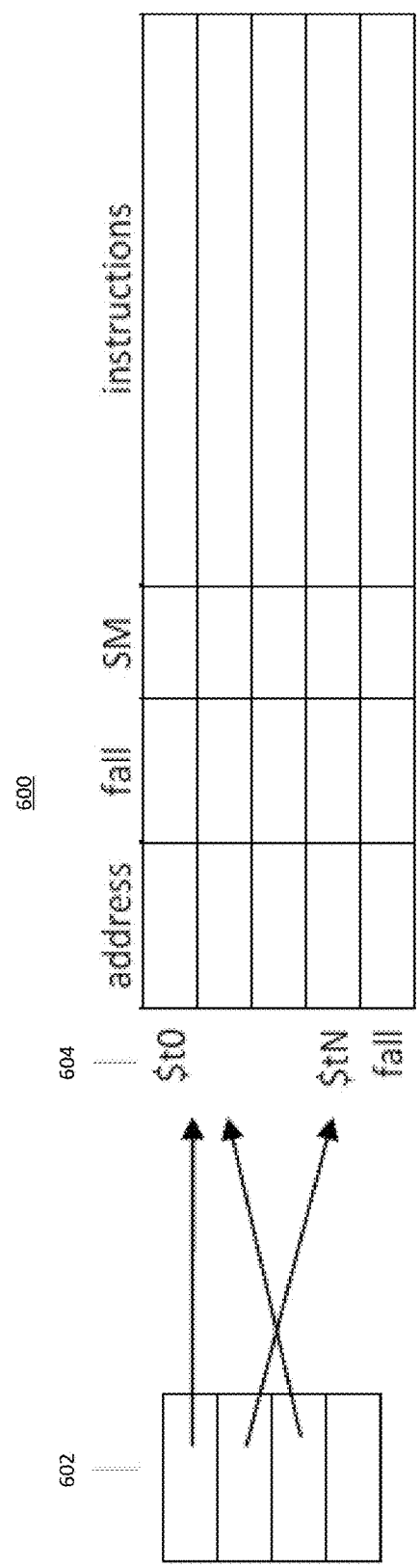
FIG. 6 is a diagram illustrating a call stack with preload and register renaming.

If the implementation uses register renaming for target registers, then every time the link register was written, a different physical register would be written. This would mean that the physical register for the link register was still around, including the preloaded data. In this case, a preferred implementation of the call stack would be as a set of pointers 602 to physical registers 604, corresponding to the renames of the link registers. This is shown in FIG. 6 (600).

To get the most out of implementing the call-stack by pointing to renamed registers, change the register allocation algorithm in the register renaming logic is needed to first allocate those free target registers that are not pointed to by the call-stack, and then to prefer those free target registers that are closer to the bottom. At some point, though, if enough renaming of target registers occurs, some elements of the call stack will need to be reused, and will no longer hold the address or preload data for the call return. At this point, the call-stack pointer should be invalidated. This is the case for the bottom entry in the call stack in the example.

When an invalid address is popped from the call stack the usual branch handling logic is used instead of prediction.

Branch Prediction

Along with the instructions, the other thing that may be preloaded is the branch prediction information corresponding to those addresses.

In an implementation that uses saturating 2 bit predictors indexed by address for branch prediction, when an instruction address is written to a target register, the branch prediction bits are copied from the branch predictor table.

One difference between preloading instructions and preloading branch prediction bits is that branch prediction bits may change between the time they are preloaded and the time they are used. Consequently, an implementation may add logic to keep them up to date. One way is to periodically reload them from the branch prediction table. Another way is to mirror the branch prediction table updates, applying any updates that affect the preloaded branch prediction bits to the copy in the target register.

Figure 7:
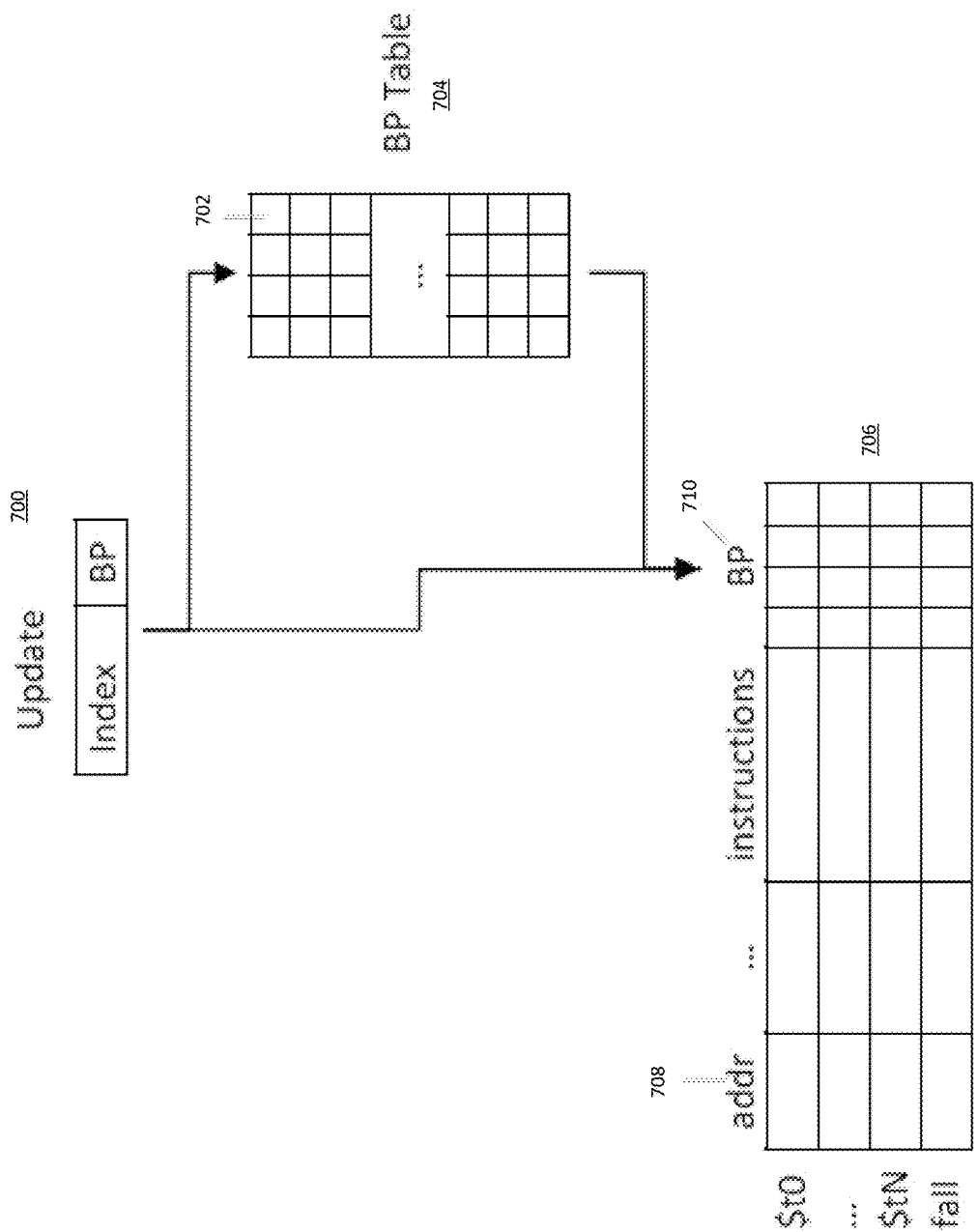
FIG. 7 is a diagram illustrating a branch prediction preload structure.

This is shown in FIG. 7 (700). It assumes that up to 4 instructions are preloaded. When the address is first written to the target register structure, the branch prediction bits 702 are copied from the branch prediction table 704 to the target register structure 706. As updates occur, and are applied to the table 704, the update index is compared against the address 708 for each of the target register structure entries in parallel. Where the addresses match, the preloaded branch prediction bits 710 are updated.

This assumes that the branch prediction is indexed only by the address 708. It has been found that mixing in the taken/not-taken history of conditional branches into the index will improve the accuracy of the branch predictor. A common technique is to take some number of bits representing the taken/not taken history, some number of bits from the address, shifting either of those sets of bits and then xoring the places where they are common.

If an implementation is using branch prediction preloading, the branch prediction entries that are preloaded cannot be dependent on the history, since the history will vary between the time the bits are preloaded and used. Further, if the target register is used as the conditional branch target multiple times, the history may be different between uses. So, if history is to be used, it must only affect the lower bits of the index.

Consider the case where we preload 24 (16) entries from the branch prediction table based on the address of the target register. Up to 4 bits of history my be mixed in to select among these entries. If the target holds up to 22 (4) instructions, then these 4 bits of history and 2 bits of address may be combined to select the correct branch prediction.

Adapting to General-Purpose Registers

The techniques described above, namely translation caching and preloading, work best when used with an architecture that has dedicated address and target register files, with base+displacement or base-only addressing. These techniques may be adapted to other architectures. In the extreme case, every write to a register could be assumed to be a potential address, and translation caching and preloading could be applied to the register.

More practically, on the data-side, most architectures provide for base+displacement, base+index, and even base+index+displacement addressing. Every time a value is written to a register, that value may be run through the DTLB and some number of pages may be translated, such as the previous/base/next page, and cached with the register. If the register is then used as part of an address computation, the finally generated address may be checked to see if it falls into the cached pages. If so, the cached translation may be used without incurring the delay to access the DTLB.

The application of translation caching may be restricted to all registers. For instance, some architectures by convention reserve certain registers as the base for addresses (such as the stack-pointer). An implementation may statically decide to treat certain general purpose registers as though they were address registers and apply translation caching/preload to them. If this implementation detail is exposed to users, then compiles and other code writers can start preferentially using these registers for addresses that are appropriate for translation caching or preloading.

Alternatively, an implementation may dynamically determine which instructions and/or registers are best treated for translation caching/preloading. The dynamic techniques may involve dynamic program analysis, such as examining the future instruction stream to predict which instruction writes are potentially used as memory or branch addresses. Another dynamic technique that can be used is history based prediction—keeping track of whether, the last time the instruction at this PC wrote a register:

the value was used as memory/branch address whether it was used as a base, or base+displacement was translation caching/preloading useful Based on that information, the implementation can choose which, if any, of the optimizations described to apply.

Figure 8:
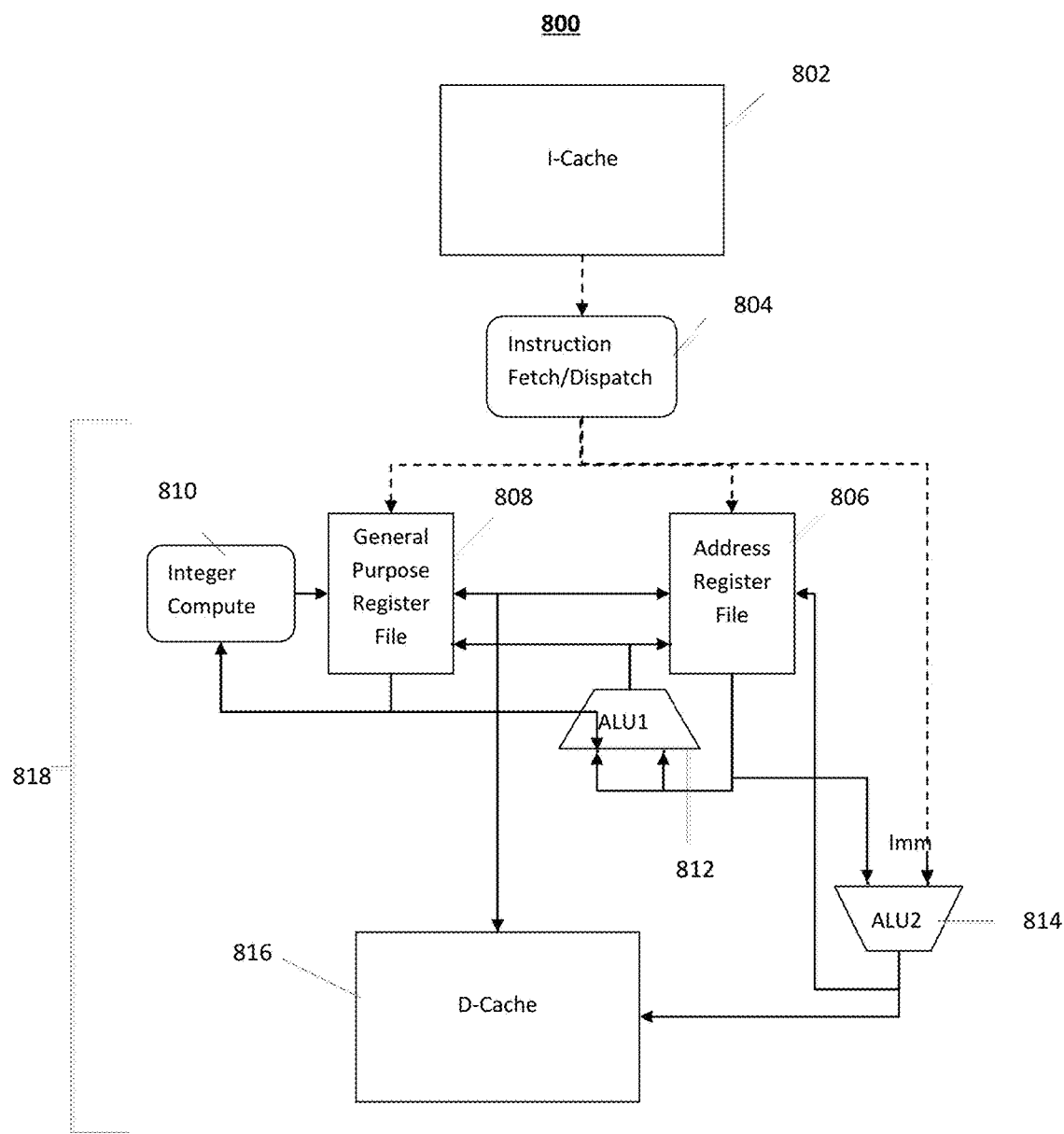
FIG. 8 is a block diagram of an architecture of a computer processor with an address register file.

FIG. 8 is a block diagram of an architecture of a computer processor 800 with an address register file 806. The computer processor 800 may include a memory 802, 816. The computer processor 800 may further include a general purpose register file 808 comprising at least one general purpose register. The computer processor 800 may further include an address register file 806 comprising at least one address register. The computer processor may further include processing logic 818 (e.g., integer comput logic 819, a first arithmetic logic unit (ALU) 812, and a second ALU 812) having access to the memory 802, 816, the general purpose register file 808, and the address register file 806. The integer compute logic 810 performs various arithmetic operations on the contents of general purpose registers of the general purpose register file 808.

The processing logic 818 may execute a memory access instruction that accesses one or more memory locations in the memory 802, 816 at one or more corresponding addresses computed by retrieving the value of an address register of the at least one register of the address register file 806 specified in the instruction and adding a displacement value encoded in the instruction.

In the computer processor 800, the memory access instruction may copy one or more memory values from the computed address into corresponding one or more registers 806, 808 in the computer processor 800. The one or more registers may be one or more general purpose registers of the general purpose register file 808. The one or more registers may be one or more address registers of the address register file 806.

In the computer processor 808, the memory access instruction may copy one or more values from corresponding one or more registers in the computer processor 800 to the memory 802, 816 at a computed address. The one or more registers may be one or more general purpose of the general purpose register file 808. The one or more registers may be one or more address registers of the address register file 806.

The processing logic 818 may add the displacement value to the least one register of the address register file 806 to produce a computed address. The processing logic 818 may use the computed address to perform a copy to/from the memory 802, 818. The processing logic 818 may update the least one register of the address register file 806 with the computed address.

The processing logic 818 may read an address stored in the least one register of the address register file 806 to produce a 0first address. The processing logic 818 may use the first address to access the memory 802, 816. The processing logic 818 may add the displacement to the first address to produce a computed address. The processing logic 818 may update the least one register of the address register file 806 with the computed address. The displacement value may be 0.

The processing logic 818 may process an instruction that may move the contents of an address register of the address register file 806 to or from a general purpose register of the general purpose register file 808. The processing logic 818 may process an instruction that may add an address value stored in an address register of the address register file 806 and a displacement value to produce a resulting value and stores the resulting value in the address register. The processing logic 818 may process an instruction that adds an address value stored in an address register of the address register file 806 and a value stored in a general purpose register of the general purpose register file 808 to produce a resulting value and may store the resulting value in the address register. The value stored in a general purpose register of the general purpose register file 808 may be shifted prior to adding.

The processing logic 818 may process an instruction that subtracts a first value stored in a first address register of the address register file 806 from a second value stored in a second address register of the address register file 806 to produce a difference value and may store the resulting value in a general purpose register of the general purpose register file 808. The value stored in the general purpose register may shifted prior to storing.

The computer processor 800 may further include a program counter 804. The processing logic 818 may further process an instruction that adds a displacement to the program counter 804 to produce a resulting value and may store the resulting value in an address register of the address register file 806. The processing logic 818 may further process an instruction that may add a signed value to an address register of the address register file 806 to produce a resulting value and may store the resulting value in a general purpose register of the general purpose register file 808. The processing logic 818 may further process an instruction that may add a first value stored in a general purpose register of the general purpose register file 808 scaled by a second value to an address register of the address register file 806 to produce a resulting value and may store the resulting value in the general purpose register. The processing logic 818 may process an instruction that may compare address values stored in two address registers of the register address file 806. The results of the comparison may be multiple bits that determine the exact ordering relationship between the value of the first address register and the value of the second address register, and may be stored in a condition flag register (not shown). The comparison may test for a specific relationship between the value of the first address register and the value of the second address register and may store a single bit into a register based on whether the test is true or false.

The processing logic 818 may process an instruction that compares two address registers of the address register file 806 to produce a result of the comparison and may branch based on the result of the comparison.

Figure 9:
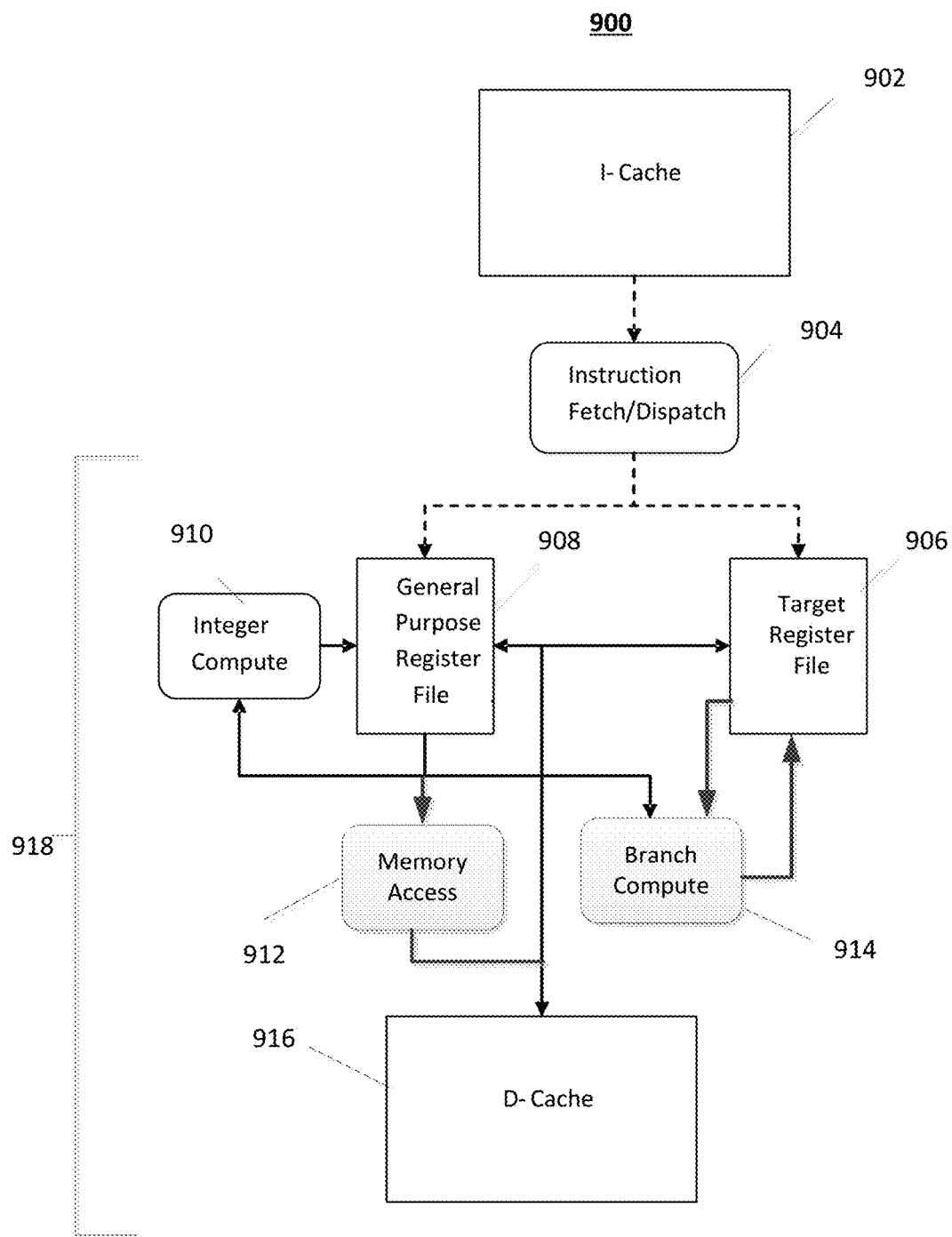
FIG. 9 is a block diagram of an architecture of a computer processor with indirect only branching.

FIG. 9 is a block diagram of an architecture of a computer processor 900 with indirect only branching. The computer processor 900 may include one or more target registers of a target register file 906. The computer processor may further include processing logic 918 in signal communication with the one or more target registers of the target register file 906.

The processing logic 918 may comprise integer comput logic 910, memory access logic 912, and branch compute logic 914. The processing logic 918 may have access to the memory 902, 916, the general purpose register file 908, and the target register file 906. The integer compute logic 910 performs various arithmetic operations on the contents of general purpose registers of the general purpose register file 908. The branch compute logic 914 may perform compares and/or determines if a branch is to be taken. The memory access logic may generate moves between the register file and the memory hierarchy.

The processing logic 918 may execute a non-interrupting branch instruction based on a value stored in a target register of the one or more target registers of the target register file 906. The non-interrupting branch instruction may use the one or more target registers of the target register file 906 to specify a destination address of a branch specified by the non-interrupting branch instruction. The computer processor 900 may further include a program counter 904 in signal communication with the one or more target registers of the target register file 906 and the processing logic 918 The processing logic 918 may process an instruction that may add a displacement value to the current value pointed to by the program counter 904 to produce an address and may set the value stored in the target register to the address. Setting the value stored in the target register to the address may comprise copying the value stored in the target register to or from a general purpose register of the general purpose register file 908. Setting the value stored in the target register to the address may comprise the processing logic 918 copying the value stored in the target register to or from a memory 902, 916.

The processing logic 918 may process an instruction that unconditionally branches to the target register of the one or more target registers of the target register file 906. The processing logic 918 may process an instruction that determines the conditions under which the branch is to be taken. In response to the processing logic 918 determining that the branch is to be taken (using the branch compute logic 914), the processing logic 918 may transfer control to the address stored in the target register of the one or more target registers of the target register file 906. The instruction may further specify one or more general purpose registers of the general purpose register file 908. The instruction may further specifies an immediate field associated with the instruction. The instruction may further specifies one or more floating point registers (not shown).

The processing logic 918 may process an instruction that performs a comparison specified as part of the the instruction between two values stored in corresponding registers of one or more registers (not shown). In response to the processing logic 918 determining that the branch is to be taken (using the branch compute logic 914), the processing logic 918 may transfer control to the address stored in the target register of the one or more target registers of the target register file 906. The registers specified by the instruction may be one or more general purpose registers of the general purpose register file 908. The registers specified by the instruction may be one or more floating point registers (not shown).

The processing logic 918 may process an instruction that performs a comparison specified as part of the the instruction between a value stored in corresponding registers of the one or more general purpose registers of the general purpose register file 908 and a value specified as an immediate field in the instruction. In response to the processing logic 918 determining that the branch is to be taken (using the branch compute logic 914), the processing logic 918 may transfer control to the address stored in the target register of the one or more target registers of the target register file 906.

The processing logic 918 may process an instruction that examines state that results from the execution of a prior instruction to determine if a branch is to be taken. In response to the processing logic 918 determining that the branch is to be taken (using the branch compute logic 914), the processing logic 918 may transfer control to the address stored in the target register of the one or more target registers of the target register file 906. The state may comprise bits that specify the result of a comparion operation between two values by a prior compare instruction. The state may comprise bits that specify the result of an implict comparion between the result of a prior instruction and 0.

The processing logic 918 may process an instruction that executes a call instruction that branches based on a value stored in the target register of the one or more target registers of the target register file 906 and updates a second target register of the one or more target registers of the target register file 906 with a return address.

The target register file 906 may be divided into a first group of target registers and a second group of target registers. The first group of target registers may comprise branch target registers, and the second group of target registers may comprise call return target registers.

The processing logic 918 may further to execute a call instruction wherein the call instruction branches based on a value stored in a branch target register of the second group of target registers, and wherein the processing logic 918 may update a call return target register of the second group with a return address.

The processing logic 918 may further to execute a return instruction wherein the return instruction specifies a call return target register, and wherein the return instruction unconditionally branches to the value in the call return target register. The return instruction may be the only branching instruction that can use a call return register as a branch target register. There may be only one call return target register.

Referring again to FIG. 2 and FIG. 8, a computer processor 800 may implement pre-translation of virtual addresses. The computer processor 800 may include a register file 806, 808 comprising one or more registers. The computer processor 800 may include processing logic 818. The processing logic 818 may receive a value to store in a register of one or more registers 806, 808. The processing logic 818 may store the value in the register. The processing logic 818 may designate the received value as a virtual address 222. The virtual address 222 may have a corresponding virtual base page number. The processing logic 818 may translate the virtual base page number to a corresponding real base page number and zero or more real page numbers corresponding to zero or more virtual page numbers adjacent to the virtual base page number. The processing logic 818 may further store in the register of the one or more registers 806, 808 the real base page number and the zero or more real page numbers.

The processing logic 818 may receive an instruction that specifies at least one register of the one or more registers 806, 808. The processing logic 818 may read one or more input register values specified in the at least one register and combine the one or more register values to produce a result value. The processing logic 818 may read real translation information stored in the one or more registers 806, 808 and combine the real translation information and the one or more input register values to compute a real translation to a real address of the result value.

The processing logic 818 may further store the result value in a second register. The processing logic 818 may store the result value and the computed real translation to the real address in the second register. The processing logic 818 may designate the result value as a virtual address to access memory 802, 816. The processor 800 may employ the computed real translation to the real address to access memory 802, 816.

The result value may be a copy of the one or more input register values and the real translation information may be a copy of translation information associated with the input register. The result value may be the result of adding to or subtracting from an input register a second value, and the real translation information may be obtained from one or more real translations associated with the input register and the second value.

An operation may comprise the addition or subtraction of a register with one or more values specified as one or more immediate values or as on or more register values. When the processing logic 818 computes the addition or the subtraction, and when the computation lies within the range of translated real pages, the processing logic 818 may select a page from the translated real pages and may concatenate page offset bits 218 of the sum with the selected real page.

When an addend/subtrahend is an immediate value with an absolute value less than a page size, the processing logic 818 may further store three real pages in the register corresponding to real address of the page corresponding to the value stored in the one or more input registers. The three real pages may correspond to the real address of the page corresponding to the next higher virtual page 206, the real address of the page corresponding to the next lower virtual page 202, and the real address corresponding to the base page 204. The processing logic 818 may, after the sum is computed, select one of the three real pages based on whether a translation results in an underflow, an overflow, or points to the base page, and a page offset 218 may be concatenated with the selected page.

When an addend/subtrahend is an immediate value with an absolute value less than one half the page size, the processing logic 818 may further store two real pages in the register corresponding to real address of the page corresponding to the value stored in the one or more input registers. The two real pages may correspond to the real address of the page corresponding to one of the next higher virtual page 206 or the next lower virtual page 202, and the real address may correspond to the base page 204, determined based on whether the value in the register is in the higher half of its current page or the lower half of its current page. The processing logic 818 may, after the sum is computed, select one of the two real pages based on whether a translation results in an underflow, an overflow, or points to the base page 204, and a page offset 218 may be concatenated with the selected page.

The one or more registers may be one or more general purpose registers of the general purpose register file 808.

The computer processor 800 may not store real translation information for all registers.

The real translation information may be computed for a pre-determined subset of all registers.

The computer processor 800 may dynamically determine which instructions or registers or both instructions and registers have their results generate real translations. The computer processor 800 may employ history based prediction to dynamically determine which instructions or registers or both instructions and registers are employed for translating a virtual base page number to a corresponding real base page number and zero or more real page numbers corresponding to zero or more virtual page numbers adjacent to the virtual base page number.

The one or more registers may be one or more address registers of the address register file 806.

A write to a register of the one or more registers with a valid real translation may initiate a prefetch of data into a level of a memory hierarchy.

The processing logic 818 may further to store in the one or more registers only the real base page number corresponding to the virtual address 222. A write to the register of the one or more registers may trigger a prefetch of data into a register associated with the register file.

When the processing logic 818 cannot map the virtual address 222 to one or more real address in the register file 806, 808, the processing logic 818 may wait until a load or store instruction is executed that employs the virtual address to raise an exception.

Referring again to FIG. 2 and FIG. 8, a computer processor 800 may implement pre-translation of virtual addresses with target registers. The computer processor 800 may include a register file 806, 808 comprising one or more registers. The computer processor 800 may include processing logic 818. The processing logic 818 may receive a value to store in a register of one or more registers 806, 808. The processing logic 818 may store the value in the register. The processing logic 818 may designate the received value as a virtual instruction address. The virtual instruction address may have a corresponding virtual base page number. The processing logic 818 may translate the virtual base page number to a corresponding real base page number and zero or more real page numbers corresponding to zero or more virtual page numbers adjacent to the virtual base page number. The processing logic 818 may further store in the register of the one or more registers 806, 808 the real base page number and the zero or more real page numbers.

The processing logic 818 may receive an instruction that specifies at least one register of the one or more registers 806, 808. The processing logic 818 may read one or more input register values specified in the at least one register and combine the one or more register values to produce a result value. The processing logic 818 may read real translation information stored in the one or more registers 806, 808 and combine the real translation information and the one or more input register values to compute a real translation to a real address of the result value. The processing logic 818 may store the result value in a second register. The processing logic 818 may store the result value and the computed real translation to the real address in the second register. The processing logic 818 may designate the result value as a virtual address 222 to access memory. The computer processor 800 may employ the computed real translation to the real address to read instructions from memory. The result value may be a copy of the one or more input register values and the real translation information may be a copy of translation information associated with the input register.

The result value may be the result of adding to or subtracting from an input register a second value. The real translation information may be obtained from one or more real translations associated with the input register and the second value.

An operation may comprise an addition or a subtraction of a register with one or more values specified as one or more immediate values or as on or more register value. When the processing logic 818 computes the addition or the subtraction, and when the computation lies within the range of translated real pages, the processing logic 818 may select a page from the translated real pages and the processing logic 818 may further concatenate page offset bits 218 of the sum with the selected real page.

When an addend/subtrahend is an immediate value with an absolute value less than a page size, the processing logic 818 may store three real pages in the register corresponding to real address of the page corresponding to the value stored in the one or more input registers. The three real pages may correspond to the real address of the page corresponding to the next higher virtual page 206, the real address of the page corresponding to the next lower virtual page 202, and the real address corresponding to the base page 204. The processing logic may, after the sum is computed, select one of the three real pages based on whether a translation results in an underflow, an overflow, or points to the base page, and a page offset may be concatenated with the selected page.

When an addend/subtrahend is an immediate value with an absolute value less than one half the page size, the processing logic 818 may store two real pages in the register corresponding to real address of the page corresponding to the value stored in the one or more input registers. The two real pages may correspond to the real address of the page corresponding to one of the next higher virtual page 206 or the next lower virtual page 202, and the real address corresponding to the base page 204, determined based on whether the value in the register is in the higher half of its current page or the lower half of its current page. The processing logic 818 may, after the sum is computed, select one of the two real pages based on whether a translation results in an underflow, an overflow, or points to the base page, and a page offset may be concatenated with the selected page.

The one or more registers may be one or more general purpose registers 808.

The computer processor 800 may not store real translation information for all registers. The real translation information may be computed for a pre-determined subset of all registers. The computer processor 800 may dynamically determines which instructions or registers or both instructions and registers have their results generate real translations. The computer processor 800 may employ history based prediction to dynamically determine which instructions or registers or both instructions and registers are employed for translating a virtual base page number to a corresponding real base page number and zero or more real page numbers corresponding to zero or more virtual page numbers adjacent to the virtual base page number.

The one or more registers may be one or more branch target registers (not shown).

A write to a register of the one or more registers with a valid real translation may initiate a prefetch of instructions into a level of a memory hierarchy.

The processing logic may store in the one or more registers only the real base page number corresponding to the virtual address 222.

A write to the register of the one or more registers may trigger a prefetch of instructions into a register associated with the register file 806, 808. When the processing logic cannot map the virtual address 222 to one or more real address in the register file 806, 808, the processing logic 818 may wait until a branch instruction is executed that employs the virtual address to raise an exception.

Figure 10:
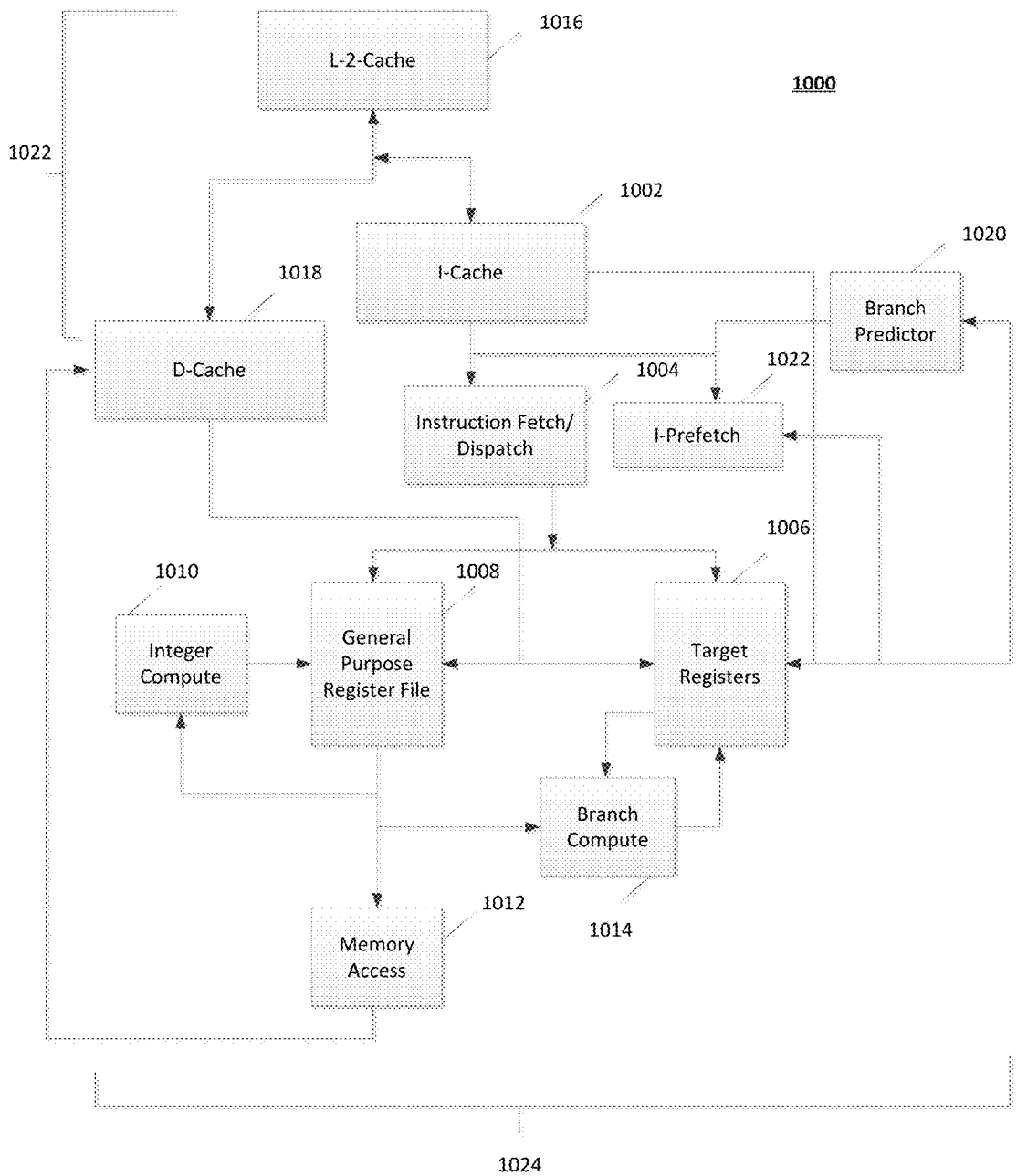
FIG. 10 is a block diagram of an architecture of a computer processor with register direct branches and employing an instruction preload structure.

FIG. 10 is a block diagram of an architecture of a computer processor 1000 with register direct branches and employing an instruction preload structure. The computer processor 1000 may include a hierarchy of memories 1022. The hierarchy of memories 1022 may comprise, but is not limited to, an instruction cache 1002, a data cache 1018, and a level two cache 1016. The hierarchy of memories 1022 may comprise a first memory 1002, 1018, 1016 organized in a structure having one or more entries for one or more addresses corresponding to one or more instructions. The one or more entries of the one or more addresses may have a starting address. The structure may have one or more locations for storing the one or more instructions. The computer processor 1000 may further comprise one or more registers 1006, 1008 to which one or more corresponding instruction addresses are writable. The computer processor 1000 may further comprise processing logic 1024. The processing logic 1024 may include integer compute logic 1010 for performing compares and/or determines if a branch is to be taken. The processing logic 1024 may include branch compute logic 1014 for manipulating target registers and for executing unconditional branches. The processing logic 1024 may include branch predictor logic 1020 to keep one or more branch prediction entries up-to-date. The processing logic 1024 may include instruction prefetch logic 1022 for identifying a next group of instructions to be read by selecting one of as yet un-prefetched addresses.

In response to the processing logic 1024 writing the one or more instruction addresses to the one or more registers 1006, 1008, the processing logic 1024 may pre-fetch the one or more instructions of a linear sequence of instructions from a first memory level 1002, 1008 of the hierarchy of memories 1022 into a second memory level 1016 of the hierarchy of memories 1022 beginning at the starting address. At least one address of the one or more addresses may be the contents of a register of the one or more registers 1006, 1008.

At least one address of the one or more addresses may be the next address for a sequence of instruction currently being processed. At least one address of the one or more addresses may be the next address of the last of the linear sequence of prefetched instructions.

The one or more entries may further comprise one or more branch prediction entries provided by the branch predictor logic 1020 for the one or more instructions. The one or more instructions in the linear sequence may correspond to a cache-line. The one or more entries may further comprise an address of the next instruction following the stored one or more instructions in the first memory level 1002, 1018 of the hierarchy of memories 1022.

The targets of branch instructions may be one or more addresses stored in one or more corresponding registers. The one or more addresses stored in one or more corresponding registers may include a fall-through address of the instruction sequence being processed. The one or more addresses stored in the one or more corresponding registers may include a fall-through addresses for a branch instruction target. The one or more addresses may comprise one or more addresses from a call stack. The call stack is implemented as a stack of pointers to the one or more entries.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A computer processor, comprising:
   a register file comprising one or more registers; and
   a processing logic to:
   receive a value to store in a register of the one or more registers;
   store the value in the register;
   designate the received value as a virtual instruction address, the virtual instruction address having a corresponding virtual base page number;
   translate the virtual base page number to a corresponding real base page number and zero or more real page numbers corresponding to zero or more virtual page numbers adjacent to the virtual base page number; and
   store in the register of the one or more registers the real base page number and the zero or more real page numbers.

2. The computer processor of claim 1, wherein the processing logic is further to:
   receive an instruction that specifies at least one register of the one or more registers;
   read one or more input register values specified in the at least one register and combine the one or more register values to produce a result value; and
   read real translation information stored in the one or more registers and combine the real translation information and the one or more input register values to compute a real translation to a real address of the result value.

3. The computer processor of claim 2, wherein the processing logic is further to store the result value in a second register, and wherein the processing logic stores the result value and the computed real translation to the real address in the second register.

4. The computer processor of claim 3, wherein the processing logic is to designate the result value as a virtual address to access memory, and wherein the computer processor is to employ the computed real translation to the real address to read instructions from a memory.

5. The computer processor of claim 2, wherein the result value is a copy of the one or more input register values, and the real translation information is a copy of the translation information associated with the input register.

6. The computer processor of claim 5, wherein when an addend/subtrahend is an immediate value with an absolute value less than one half of the page size, the processing logic is to further store two real pages in the register corresponding to real address of the page corresponding to the value stored in the one or more input registers.

7. The computer processor of claim 2, wherein the result value is the result of adding to or subtracting from an input register a second value, and the real translation information is obtained from one or more real translations associated with the input register and the second value.

8. The computer processor of claim 7, wherein an operation comprises the addition or subtraction of a register with one or more values specified as one or more immediate values or as one or more register values, wherein when the processing logic computes the addition or the subtraction, and when the computation lies within the range of translated real pages, the processing logic is to select a page from the translated real pages and the processing logic further is to concatenate page offset bits of the sum with the selected real page.

9. The computer processor of claim 7, wherein when an addend/subtrahend is an immediate value with an absolute value less than a page size, the processing logic is to further store three real pages in the register corresponding to a real address of the page corresponding to the value stored in the one or more input registers.

10. The computer processor of claim 9, wherein the three real pages correspond to the real address of the page corresponding to the next higher virtual page, the real address of the page corresponding to the next lower virtual page, and the real address corresponding to the base page.

11. The computer processor of claim 10, wherein the two real pages correspond to the real address of the page corresponding to one of the next higher virtual page or the next lower virtual page, and the real address corresponding to the base page, determined based on whether the value in the register is in the higher half of its current page or the lower half of its current page.

12. The computer processor of claim 11, wherein the processing logic is to, after the sum is computed, select one of the two real pages based on whether a translation results in an underflow, an overflow, or points to the base page, and a page offset is concatenated with the selected page.

13. The computer processor of claim 9, wherein the processing logic is to, after the sum is computed, select one of the three real pages based on whether a translation results in an underflow, an overflow, or points to the base page, and a page offset is concatenated with the selected page.

14. The computer processor of claim 1, wherein the one or more registers are one or more general purpose registers.

15. The computer processor of claim 1, wherein the computer processor does not store real translation information for all registers.

16. The computer processor of claim 15, wherein the real translation information is computed for a pre-determined subset of all registers.

17. The computer processor of claim 1, wherein the computer processor is to dynamically determine which instructions or registers or both instructions and registers have their results generate real translations.

18. The computer processor of claim 17, wherein the computer processor is to employ history based prediction to dynamically determine which instructions or registers or both instructions and registers are employed for translating a virtual base page number to a corresponding real base page number and zero or more real page numbers corresponding to zero or more virtual page numbers adjacent to the virtual base page number.

19. The computer processor of claim 1, wherein the one or more registers are one or more branch target registers.

20. The computer processor of claim 1, wherein a write to a register of the one or more registers with a valid real translation initiates a prefetch of instructions into a level of a memory hierarchy.

21. The computer processor of claim 1, wherein the processing logic is further to store in the one or more registers only the real base page number corresponding to a virtual address.

22. The computer processor of claim 21, wherein a write to the register of the one or more registers triggers a prefetch of instructions into a register associated with a register file.

23. The computer processor of claim 1, wherein, when the processing logic cannot map the virtual address to one or more real address in a register file, the processing logic is further to wait until a branch instruction, that employs the virtual address to raise an exception, is executed.

24. A method comprising:
receiving, by a processing logic of the computer processor, a value to store in a register of one or more registers of a register file;
storing, by the processing logic, the value in the register;
designating, by the processing logic, the received value as a virtual address, the virtual address having a corresponding virtual base page number;
translating, by the processing logic, the virtual base page number to a corresponding real base page number and zero or more real page numbers corresponding to zero or more virtual page numbers adjacent to the virtual base page number; and
storing, by the processing logic in the register of the one or more registers, the real base page number and the zero or more real page numbers.

25. The method of claim 24, further comprising:
receiving an instruction that specifies at least one register of the one or more registers;
reading one or more input register values specified in the at least one register and combine the one or more register values to produce a result value; and
reading real translation information stored in the one or more registers and combine the real translation information and the one or more input register values to compute a real translation to a real address of the result value.

26. The method of claim 25, further comprising:
storing the result value in a second register; and
storing the result value and the computed real translation to the real address in the second register.

27. The method of claim 26, further comprising:
designating the result value as a virtual address to access memory; and
employing the computed real translation to the real address to read instructions from memory.

28. The method of claim 26, wherein when an addend/subtrahend is an immediate value with an absolute value less than one half of the page size, further comprising storing two real pages in the register corresponding to real address of the page corresponding to the value stored in the one or more input registers.

29. The method of claim 24, wherein the result value is a copy of the one or more input register values and the real translation information is a copy of translation information associated with the input register.

30. The method of claim 24, wherein the result value is the result of adding to or subtracting from an input register a second value, and the real translation information is obtained from one or more real translations associated with the input register and the second value.

31. The method of claim 30, wherein an operation comprises the addition or subtraction of a register with one or more values specified as one or more immediate values or as one or more register values, and further comprising:
computing the addition or the subtraction, and when the computation lies within the range of translated real pages,
selecting a page from the translated real pages; and
concatenating page offset bits of the sum with the selected real page.

32. The method of claim 30, wherein when an addend/subtrahend is an immediate value with an absolute value less than a page size, further comprising storing three real pages in the register corresponding to real address of the page corresponding to the value stored in the one or more input registers.

33. The method of claim 32, wherein the three real pages correspond to the real address of the page corresponding to the next higher virtual page, the real address of the page corresponding to the next lower virtual page, and the real address corresponding to the base page.

34. The method of claim 33, wherein the two real pages correspond to the real address of the page corresponding to one of the next higher virtual page or the next lower virtual page, and the real address corresponding to the base page, determined based on whether the value in the register is in the higher half of its current page or the lower half of its current page.

35. The method of claim 33, after the sum is computed, further comprising:
selecting one of the two real pages based on whether a translation results in an underflow, an overflow, or points to the base page; and
concatenating a page offset with the selected page.

36. The method of claim 32, wherein, after the sum is computed, further comprising:
selecting one of the three real pages based on whether a translation results in and underflow, an overflow, or points to the base page; and
concatenating a page offset with the selected page.

37. The method of claim 24, wherein the one or more registers are one or more general purpose registers.

38. The method of claim 24, further comprising not storing real translation information for all registers.

39. The method of claim 38, further comprising computing the real translation information for a pre-determined subset of all registers.

40. The method of claim 24, further comprising dynamically determining which instructions or registers or both instructions and registers have their results generate real translations.

41. The method of claim 40, further comprising:
employing history based prediction to dynamically determine which instructions or registers or both instructions and registers are employed for translating a virtual base page number to a corresponding real base page number and zero or more real page numbers corresponding to zero or more virtual page numbers adjacent to the virtual base page number.

42. The method of claim 24, wherein the one or more registers are one or more branch target registers.

43. The method of claim 24, wherein a write to a register of the one or more registers with a valid real translation initiates a prefetch of instructions into a level of a memory hierarchy.

44. The method of claim 24, further comprising storing in the one or more registers only the real base page number corresponding to a virtual address.

45. The method of claim 44, wherein a write to the register of the one or more registers triggers a prefetch of instructions into a register associated with a register file.

46. The method of claim 24, when the processing logic cannot map the virtual address to one or more real address in a register file, further comprising waiting until a branch instruction, that employs the virtual address to raise an exception, is executed.

* * * * *